United States Patent
Elshafie et al.

(10) Patent No.: US 12,289,750 B2
(45) Date of Patent: Apr. 29, 2025

(54) TECHNIQUES FOR MODIFYING CHANNEL STATE INFORMATION

(71) Applicant: QUALCOMM Incorporated, San Diego, CA (US)

(72) Inventors: Ahmed Elshafie, San Diego, CA (US); Ahmed Attia Abotabl, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 502 days.

(21) Appl. No.: 17/543,470

(22) Filed: Dec. 6, 2021

(65) Prior Publication Data

US 2023/0180278 A1    Jun. 8, 2023

(51) Int. Cl.
*H04W 72/542* (2023.01)
*H04L 1/1812* (2023.01)
*H04L 5/14* (2006.01)
*H04W 72/1273* (2023.01)
*H04W 72/23* (2023.01)
*H04W 72/566* (2023.01)

(52) U.S. Cl.
CPC ......... *H04W 72/542* (2023.01); *H04L 1/1812* (2013.01); *H04L 5/1469* (2013.01); *H04W 72/1273* (2013.01); *H04W 72/23* (2023.01); *H04W 72/569* (2023.01)

(58) Field of Classification Search
CPC . H04W 72/542; H04W 72/569; H04W 72/23; H04W 72/1273; H04L 1/1812; H04L 5/1469
See application file for complete search history.

(56) References Cited

U.S. PATENT DOCUMENTS

| 2012/0092989 A1* | 4/2012 | Baldemair ............ H04W 24/10 370/230 |
| 2014/0092787 A1* | 4/2014 | Han ..................... H04W 72/21 370/280 |
| 2019/0223036 A1* | 7/2019 | Lunttila .............. H04W 72/569 |

(Continued)

OTHER PUBLICATIONS

Nokia, "Remaining details for CSI reporting on PUCCH", Jan. 22, 2018, 3gpp TSG RAN WG1 meeting AH 1801, R1-1800744, all pages (Year: 2018).*

*Primary Examiner* — Christopher M Crutchfield
*Assistant Examiner* — Tito Q Pham
(74) *Attorney, Agent, or Firm* — Guang Y. Zhang; Holland & Hart LLP

(57) ABSTRACT

Methods, systems, and devices for wireless communications are described. A user equipment (UE) may modify the contents of a channel state information (CSI) report based on delaying transmission of the CSI report. For example, a base station may transmit one or more downlink messages to the UE from which the UE may generate CSI. The UE may delay transmitting a CSI report that includes the CSI report one or more times, for example, due to a collision between a semi-persistent scheduling (SPS) scheme and a time division duplexing (TDD) scheme according to which the UE and the base station communicate. Based on a quantity of occasions that the UE delays transmission of the CSI report, the UE may modify the CSI included in the CSI report and transmit the CSI report including the modified CSI to the base station.

30 Claims, 19 Drawing Sheets

(56) References Cited

U.S. PATENT DOCUMENTS

| | | | | |
|---|---|---|---|---|
| 2019/0261391 A1* | 8/2019 | Kundu | ............... | H04L 1/0073 |
| 2020/0169364 A1* | 5/2020 | Hao | ............... | H04L 5/0044 |
| 2021/0021315 A1* | 1/2021 | Song | ............... | H04L 5/0057 |
| 2021/0037526 A1* | 2/2021 | Takeda | ............... | H04L 5/0094 |
| 2021/0105796 A1* | 4/2021 | Yang | ............... | H04W 72/569 |
| 2022/0352950 A1* | 11/2022 | Faxér | ............... | H04B 7/0626 |
| 2024/0023081 A1* | 1/2024 | Kumagai | ............... | H04L 1/18 |

* cited by examiner

TECHNIQUES FOR MODIFYING CHANNEL STATE INFORMATION

FIELD OF TECHNOLOGY

The following relates to wireless communications, including techniques for modifying channel state information (CSI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE and a base station may communicate channel state information (CSI) via CSI reports. In some cases, a scheduled transmission of a CSI report may collide with a scheduled downlink slot between the UE and the base station. As a result, the UE may delay transmitting the CSI report until a next available uplink slot.

SUMMARY

The described techniques relate to improved methods, systems, devices, and apparatuses that support techniques for modifying channel state information (CSI). Generally, the described techniques provide for adjusting the content included in a CSI report in response to delaying a scheduled transmission of the CSI report. For example, a base station may transmit one or more downlink messages to a user equipment (UE) that are associated with reporting CSI between the UE and the base station. For instance, the UE may receive and measure the one or more downlink messages and may generate CSI corresponding to the measurements of the one or more downlink messages. The UE may be scheduled to transmit a CSI report including the CSI to the base station in response to receiving the one or more downlink messages. For example, the UE and base station may communicate according to a semi-persistent scheduling (SPS) scheme that indicates a periodicity of semi-persistently-scheduled physical downlink shared channel (PDSCH) occasions (e.g., a time between two PDSCH occasions) and a physical uplink channel (PUCCH) occasion scheduled to occur some duration after a given PDSCH occasion (e.g., via which a downlink message may be transmitted). Accordingly, the UE may be scheduled to transmit the CSI report in a PUCCH occasion in accordance with the SPS scheme.

The UE may delay (e.g., defer) the scheduled transmission of the CSI report on one or more occasions due to a collision between the SPS scheme and a time division duplexing (TDD) scheme according to which the UE and the base station communicate. For example, the PUCCH occasion associated with the SPS scheme may collide with a downlink slot of the TDD scheme, which may cause the UE to delay transmitting the CSI report, for example, until a next available uplink slot of the TDD scheme. Based on the quantity of occasions that the UE delays transmitting the CSI report, the UE may modify the contents of the CSI report (e.g., the CSI that is included in the CSI report). For example, the UE may drop one or more types of CSI from the CSI report based on how many times the UE delays transmitting the CSI report (e.g., may drop additional CSI from the CSI report with each delay). The UE may transmit the CSI report including the modified CSI to the base station, for example, during a next available uplink slot of the TDD scheme.

A method for wireless communication at a UE is described. The method may include receiving, from a base station, one or more downlink messages associated with reporting CSI between the UE and the base station, modifying CSI included in a CSI report associated with the one or more downlink messages, the CSI being modified based on a quantity of occasions that a scheduled transmission of the CSI report is delayed, and transmitting, to the base station, the CSI report including the modified CSI.

An apparatus for wireless communication at a UE is described. The apparatus may include a memory and a processor coupled to the memory. The processor may be configured to receive, from a base station, one or more downlink messages associated with reporting CSI between the UE and the base station, modify CSI included in a CSI report associated with the one or more downlink messages, the CSI being modified based on a quantity of occasions that a scheduled transmission of the CSI report is delayed, and transmit, to the base station, the CSI report including the modified CSI.

Another apparatus for wireless communication at a UE is described. The apparatus may include means for receiving, from a base station, one or more downlink messages associated with reporting CSI between the UE and the base station, means for modifying CSI included in a CSI report associated with the one or more downlink messages, the CSI being modified based on a quantity of occasions that a scheduled transmission of the CSI report is delayed, and means for transmitting, to the base station, the CSI report including the modified CSI.

A non-transitory computer-readable medium storing code for wireless communication at a UE is described. The code may include instructions executable by a processor to receive, from a base station, one or more downlink messages associated with reporting CSI between the UE and the base station, modify CSI included in a CSI report associated with the one or more downlink messages, the CSI being modified based on a quantity of occasions that a scheduled transmission of the CSI report is delayed, and transmit, to the base station, the CSI report including the modified CSI.

In some examples of the method, apparatuses, and non-transitory computer-readable medium described herein, modifying the CSI included for the CSI report may include operations, features, means, or instructions for dropping one or more CSI types from the CSI report based on the quantity of occasions that the scheduled transmission of the CSI report may be delayed.

In some examples of the method, apparatuses, and non-transitory computer-readable medium described herein, the one or more CSI types include a demodulation reference signal (DMRS) reference signal received power (RSRP), a wideband precoding matrix indicator (PMI), a subband PMI, a wideband channel quality indicator (CQI), a subband CQI, a rank indicator, or a combination thereof.

Some examples of the method, apparatuses, and non-transitory computer-readable medium described herein may further include operations, features, means, or instructions for receiving, from the base station, one or more additional downlink messages associated with reporting second CSI between the UE and the base station and dropping a transmission of a second CSI report associated with the one or more additional downlink messages based on a second quantity of occasions that a scheduled transmission of the second CSI report may be delayed satisfying a threshold.

Some examples of the method, apparatuses, and non-transitory computer-readable medium described herein may further include operations, features, means, or instructions for generating one or more hybrid automatic repeat request (HARQ) feedback reports corresponding to the one or more downlink messages, one or more other downlink messages, or both, where the CSI may be modified based on generating the one or more HARQ feedback reports and transmitting the one or more HARQ feedback reports to the base station.

Some examples of the method, apparatuses, and non-transitory computer-readable medium described herein may further include operations, features, means, or instructions for multiplexing the one or more HARQ feedback reports and the CSI report including the modified CSI, where the one or more HARQ feedback reports and the CSI report may be transmitted using a same uplink resource, and where the CSI may be modified such that a payload size of the multiplexed one or more HARQ feedback reports and CSI report satisfies a threshold payload size.

In some examples of the method, apparatuses, and non-transitory computer-readable medium described herein, the CSI may be modified based on a priority associated with the one or more downlink messages, a quality of service (QOS) associated with the one or more downlink messages, or a combination thereof.

In some examples of the method, apparatuses, and non-transitory computer-readable medium described herein, modifying the CSI included for the CSI report may include operations, features, means, or instructions for refraining from dropping one or more CSI types from the CSI report based on the priority satisfying a threshold priority, the QoS satisfying a threshold QoS, or a combination thereof.

Some examples of the method, apparatuses, and non-transitory computer-readable medium described herein may further include operations, features, means, or instructions for receiving, from the base station, an indication of a sequence of reporting configurations for the CSI report, where each reporting configuration indicates a respective set of CSI types to include in the CSI report or drop from the CSI report and selecting a reporting configuration from the sequence of reporting configurations based on the quantity of occasions that the scheduled transmission of the CSI report may be delayed, where the CSI may be modified in accordance with the selected reporting configuration.

Some examples of the method, apparatuses, and non-transitory computer-readable medium described herein may further include operations, features, means, or instructions for receiving, from the base station, an indication of a reporting configuration for the CSI report, where the reporting configuration includes a set of multiple sets of CSI types to include in the CSI report or drop from the CSI report and selecting a set of CSI types from the plurality based on the quantity of occasions that the scheduled transmission of the CSI report may be delayed, where the CSI may be modified in accordance with the selected set of CSI types.

In some examples of the method, apparatuses, and non-transitory computer-readable medium described herein, the UE and the base station may be configured to communicate in accordance with an SPS scheme and a TDD scheme and the scheduled transmission of the CSI report may be delayed based on a collision between a downlink slot of the TDD scheme and an uplink grant for transmitting the CSI report associated with the SPS scheme.

Some examples of the method, apparatuses, and non-transitory computer-readable medium described herein may further include operations, features, means, or instructions for receiving, from a second UE, one or more sidelink messages associated with reporting CSI between the UE and the second UE, modifying second CSI included in a second CSI report associated with the one or more sidelink messages, the CSI being modified based on a quantity of occasions that a scheduled transmission of the second CSI report may be delayed, and transmitting, to the second UE, the second CSI report including the modified second CSI.

A method for wireless communication at a base station is described. The method may include transmitting, to a UE, one or more downlink messages associated with reporting CSI between the base station and the UE and receiving, from the UE, a CSI report associated with the one or more downlink messages, where the CSI report includes CSI that is modified based on a quantity of occasions that a scheduled transmission of the CSI report is delayed.

An apparatus for wireless communication at a base station is described. The apparatus may include a memory and a processor coupled to the memory. The processor may be configured to transmit, to a UE, one or more downlink messages associated with reporting CSI between the base station and the UE and receive, from the UE, a CSI report associated with the one or more downlink messages, where the CSI report includes CSI that is modified based on a quantity of occasions that a scheduled transmission of the CSI report is delayed.

Another apparatus for wireless communication at a base station is described. The apparatus may include means for transmitting, to a UE, one or more downlink messages associated with reporting CSI between the base station and the UE and means for receiving, from the UE, a CSI report associated with the one or more downlink messages, where the CSI report includes CSI that is modified based on a quantity of occasions that a scheduled transmission of the CSI report is delayed.

A non-transitory computer-readable medium storing code for wireless communication at a base station is described. The code may include instructions executable by a processor to transmit, to a UE, one or more downlink messages associated with reporting CSI between the base station and the UE and receive, from the UE, a CSI report associated with the one or more downlink messages, where the CSI report includes CSI that is modified based on a quantity of occasions that a scheduled transmission of the CSI report is delayed.

In some examples of the method, apparatuses, and non-transitory computer-readable medium described herein, one or more CSI types may be dropped from the CSI report based on the quantity of occasions that the scheduled transmission of the CSI report may be delayed.

In some examples of the method, apparatuses, and non-transitory computer-readable medium described herein, the one or more CSI types include a DMRS RSRP, a wideband PMI, a subband PMI, a wideband CQI, a subband CQI, a rank indicator, or a combination thereof.

Some examples of the method, apparatuses, and non-transitory computer-readable medium described herein may further include operations, features, means, or instructions for receiving, from the UE, one or more HARQ feedback reports corresponding to the one or more downlink messages, one or more other downlink messages, or both, where the CSI may be modified based on the one or more HARQ feedback reports.

In some examples of the method, apparatuses, and non-transitory computer-readable medium described herein, the one or more HARQ feedback reports and the CSI report may be multiplexed and received in a same uplink resource and the CSI may be modified such that a payload size of the multiplexed one or more HARQ feedback reports and CSI report satisfies a threshold payload size.

In some examples of the method, apparatuses, and non-transitory computer-readable medium described herein, the CSI may be modified based on a priority associated with the one or more downlink messages, a QoS associated with the one or more downlink messages, or a combination thereof.

In some examples of the method, apparatuses, and non-transitory computer-readable medium described herein, one or more CSI types may be included in the modified CSI based on the priority satisfying a threshold priority, the QoS satisfying a threshold QoS, or a combination thereof.

Some examples of the method, apparatuses, and non-transitory computer-readable medium described herein may further include operations, features, means, or instructions for transmitting, to the UE, an indication of a sequence of reporting configurations for the CSI report, each reporting configuration indicating a respective set of CSI types to include in the CSI report or drop from the CSI report, where the CSI may be modified in accordance with a reporting configuration of the sequence of reporting configurations based on the quantity of occasions that the scheduled transmission of the CSI report may be delayed.

Some examples of the method, apparatuses, and non-transitory computer-readable medium described herein may further include operations, features, means, or instructions for transmitting, to the UE, an indication of a reporting configuration for the CSI report, the reporting configuration including a set of multiple sets of CSI types to include in the CSI report or drop from the CSI report, where the CSI may be modified in accordance with a set of CSI types of the plurality based on the quantity of occasions that the scheduled transmission of the CSI report may be delayed.

In some examples of the method, apparatuses, and non-transitory computer-readable medium described herein, the UE and the base station may be configured to communicate in accordance with an SPS scheme and a TDD scheme and the scheduled transmission of the CSI report may be delayed based on a collision between a downlink slot of the TDD scheme and an uplink grant for transmitting the CSI report associated with the SPS scheme.

DETAILED DESCRIPTION

Figure 1:
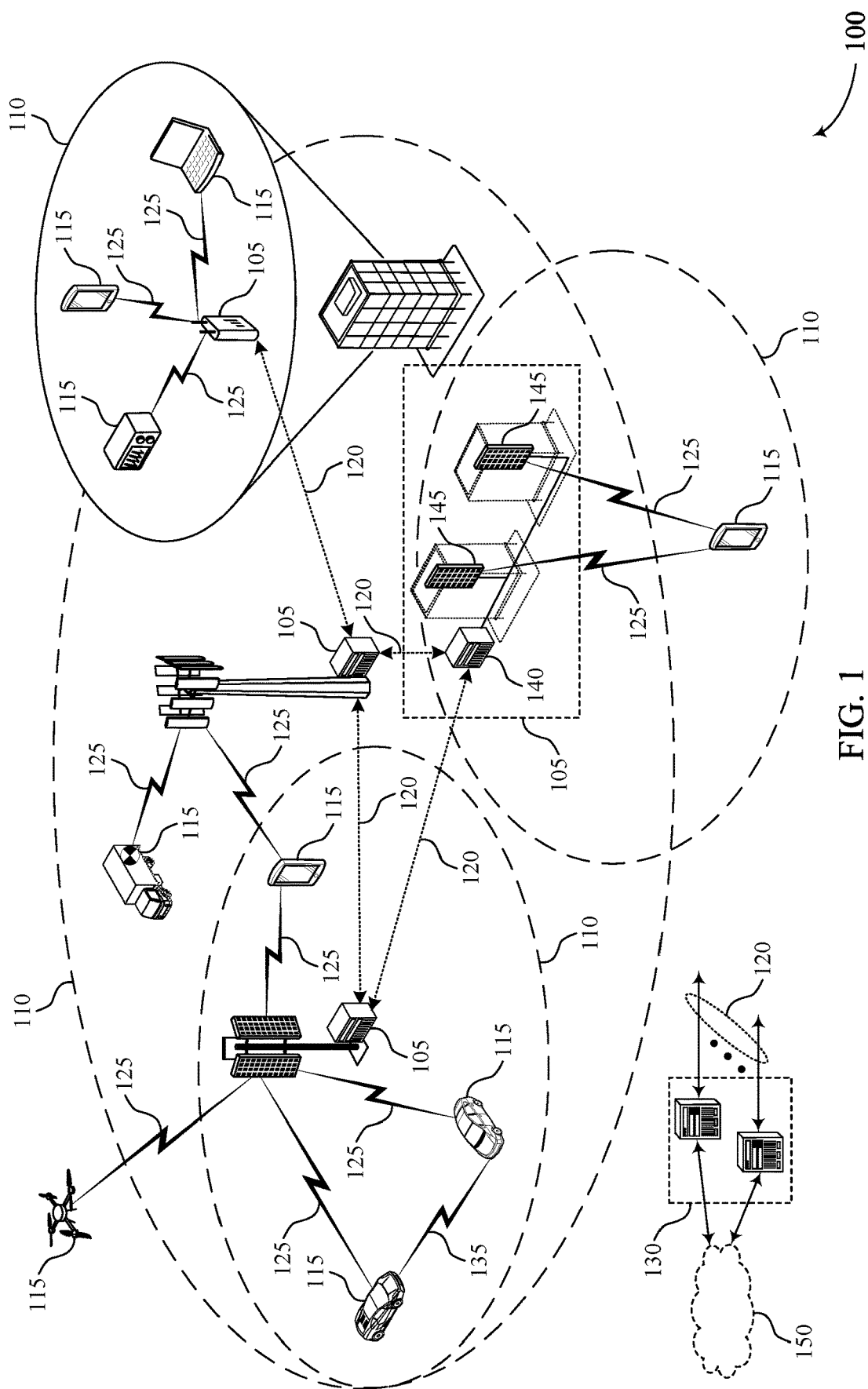
FIGS. 1 and 2 illustrate examples of wireless communications systems that support techniques for modifying channel state information (CSI) in accordance with aspects of the present disclosure.

Some wireless communications systems may include communication devices, such as a user equipment (UE) and a base station (e.g., an eNodeB (eNB), a next-generation NodeB or a giga-NodeB, either of which may be referred to as a gNB, or some other base station), that may support multiple radio access technologies (RATs). Examples of RATs include fourth generation (4G) systems, such as Long Term Evolution (LTE) systems, and fifth-generation (5G) systems, which may be referred to as new radio (NR) systems. In some examples, communication devices (e.g., a UE and a base station, a first UE and a second UE) may be configured to communicate channel state information (CSI), for example, to enable channel estimation, modulation and coding scheme (MCS) selection, code rate selection, beamforming, and the like. For example, a base station may transmit downlink messages to a UE, which the UE may measure and generate corresponding CSI. The UE may communicate the CSI to the base station by transmitting a CSI report to the base station that includes the CSI.

In some examples, a UE and a base station may be configured to communicate according to a semi-persistent scheduling (SPS) scheme. The SPS scheme may indicate a periodicity of physical downlink shared channel (PDSCH) occasions (e.g., a time between two PDSCH occasions) and a physical uplink control channel (PUCCH) occasion scheduled to occur after receiving a given PDSCH. In some examples, the base station may transmit downlink messages over PDSCHs, and the UE may be configured to transmit a CSI report in a PUCCH occasion corresponding to a given PDSCH occasion.

In some examples, the UE and the base station may also communicate according to a time division duplexing (TDD) scheme in which the UE and the base station may communicate according to a slot pattern of uplink slots and downlink slots. In some cases, the TDD scheme may collide with the SPS scheme. For example, the base station may transmit a downlink message to the UE in a first downlink slot (e.g., in accordance with the TDD scheme) and over a PDSCH (e.g., in accordance with the SPS scheme). The SPS scheme may indicate that a PUCCH occasion for transmitting a CSI report corresponding to the downlink message occurs some quantity of slots after the PDSCH (e.g., one slots, two slots, three slots, or some other quantity of slots). However, in some cases, the indicated PUCCH occasion may occur within a second downlink slot of the TDD scheme, thus resulting in a collision between the PUCCH occasion and the downlink slot. Put another way, the UE may be configured to receive the periodic downlink transmissions in accordance with the SPS scheme, but a TDD slot structure may be configured such that a transmission occasion for transmitting feedback and/or CSI may coincide with downlink resources, precluding the transmission of the feedback or CSI in the uplink at that time. As a result, the UE may be configured to delay (e.g., defer) a transmission of the feedback and/or CSI report, for example, until a next available uplink slot of the TDD scheme. In some cases, however, the UE may generate and accumulate multiple CSI reports (e.g., corresponding to multiple downlink messages transmitted by the base station) and a payload size of the accumulated CSI reports may be greater than a PUCCH grant size for the next available uplink slot. Additionally, or alternatively, some CSI included in a CSI report may become increasingly irrelevant (e.g., outdated) as time progresses from reception of a corresponding downlink message. Thus, transmission of such CSI may reduce resource efficiency (e.g., waste resources used to convey such CSI) and may increase latency associated with transmitting other more relevant CSI.

Techniques, systems, and devices are described herein to enable CSI report content modification when a CSI report is delayed (e.g., deferred). For example, a base station may transmit (e.g., according to an SPS scheme) one or more downlink messages to a UE that are associated with reporting CSI between the UE and the base station. The UE may receive the one or more downlink messages and may generate a CSI report corresponding to the one or more downlink messages. The UE may delay (e.g., defer) a scheduled transmission of the CSI report (e.g., in a PUCCH occasion of the SPS scheme) one or more times, for example, due to collision(s) between the scheduled transmission of the CSI report and downlink slot(s) of a TDD scheme according to which the UE and the base station communicate. Based on a quantity of occasions that the UE delays the scheduled transmission of the CSI report, the UE may modify CSI included in the CSI report. For example, the UE may drop one or more types of CSI from the CSI report based on the quantity of occasions (e.g., the UE may drop more CSI types from the CSI report as the quantity of occasions increases). In some examples, the UE may modify the CSI in accordance with one or more rules known to the UE and the base station (e.g., preconfigured rules, configured rules). In some examples, the UE may modify the CSI in accordance with a reporting configuration indicated by the base station that indicated which CSI types to include in or remove from the CSI report. The UE may transmit the CSI report including the modified CSI to the base station, for example, during a next available uplink slot of the TDD scheme.

Aspects of the subject matter described in this disclosure may be implemented to realize one or more of the following potential improvements, among others. The techniques employed by the described communication devices may enable the modification of CSI report contents if a transmission of a CSI report is delayed, which may increase resource usage efficiency, reduce power consumption, and reduce latency associated with communicating groupcast retransmissions. For example, dropping CSI types from a CSI report based on a quantity of occasions that the CSI report is delayed may prioritize the communication of relatively more useful (e.g., more relevant) CSI, thereby decreasing resource waste and enabling earlier transmission of such CSI. Additionally, reducing a quantity of CSI communicated between the UE and the base station as a result of the CSI modification may reduce power consumption and increase battery life. In some examples, managing CSI report content based on CSI reporting delays may increase coordination between communication devices, increase spectral efficiency, and increase data rates, among other benefits.

Aspects of the disclosure are initially described in the context of wireless communications systems. Aspects of the disclosure are additionally described in the context communication diagrams and a process flow. Aspects of the disclosure are further illustrated by and described with reference to apparatus diagrams, system diagrams, and flowcharts that relate to techniques for modifying CSI.

FIG. 1 illustrates an example of a wireless communications system 100 that supports techniques for modifying CSI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). In some cases, carriers configured in a TDD mode may include various slot patterns of uplink slots, downlink slots, and flexible slots (e.g., special slots) that may be either uplink slots or downlink slots. For example, a carrier configured in a TDD mode may be configured to include slots according to a DDDDDDDDDDDUUUU, a DDDDDDDDDDUDUU, a DDDSU pattern, a DDDSUDDSUU pattern, a DDDDDDDSUU pattern, or a DDDUU pattern, among other patterns, where D is a downlink slot, S is a flexible slot, and U is an uplink slot.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a subband, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group.

In some examples, a base station 105 facilitates the scheduling of resources for D2D communications. In some other examples, D2D communications are carried out between the UEs 115 without the involvement of a base station 105. For example, the wireless communications system 100 may be an example of a sidelink network that supports one or more resource allocation modes to coordinate sidelink communications (e.g., D2D communications) between UEs 115 (e.g., over D2D communication links 135, over PC5 links). For instance, the sidelink network may be configurable to operate according a Mode 1 resource allocation mode and/or a Mode 2 resource allocation mode. While operating in Mode 1, the sidelink network (e.g., sidelink communications over the sidelink network) may be managed (e.g., coordinated) by a base station 105. For example, during Mode 1 operation, the base station 105 may manage sidelink resource allocation over the sidelink network.

While operating in Mode 2, the sidelink network may not be managed or coordinated by the base station 105. Without coordination or management of sidelink resources of the sidelink network during the Mode 2 operation, UEs 115 may follow contention-based access procedures in which the various UEs 115 may reserve sidelink resources of the sidelink network. For example, during Mode 2 operation, a UE 115 may monitor the sidelink network to determine if other UEs 115 are attempting to transmit over the sidelink network. For instance, the UE 115 may decode one or more reservation messages (e.g., sidelink control channel transmissions such as sidelink control information (SCI) messages, SCI-1 messages, SCI-2 messages, request-to-send-messages, or some other sidelink control channel transmissions) and may determine which sidelink resources are reserved for other sidelink communications and which sidelink resources are available for sidelink communications based on the reservation messages. In some cases, the UE 115 may determine which sidelink resources are available for sidelink communications based on reservation messages decoded during a sensing window, where the sensing window corresponds to some duration of time prior to the arrival of a packet of information. In some examples, the packet arrival may trigger the UE 115 to determine which sidelink resources are available and to reserve sidelink resources. In some examples, UEs 115 may be configured with one or more sidelink resource pools from which to select and reserve sidelink resources (e.g., during Mode 2 operation).

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more subbands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support the communication of CSI between communication devices (e.g., between a UE 115 and a base station 105, between UEs 115) to facilitate (e.g., enable, support) channel estimation, MCS selection, code rate selection, beamforming, and the like. For example, a UE 115 may receive messages (e.g., downlink messages, sidelink messages) that include reference signals such as demodulation reference signals (DMRS) or CSI-RSs (among other reference signals). The UE 115 may measure the reference signals, generate CSI based on the measurements, and transmit the generated CSI in a CSI report to a communication device (e.g., a base station 105, another UE 115) from which the UE 115 received the messages. Examples of types of CSI may include a DMRS reference signal received power (RSRP), a rank indicator, a channel quality indicator (CQI), or a PMI, among other types of CSI. A rank indicator may request a number of layers to be used for downlink transmissions or sidelink transmissions (e.g., based on antenna ports of the UE 115). A CQI may represent a highest MCS that may be used by the UE 115. A PMI may indicate a preference for which precoder matrix should be used (e.g., based on a number of layers).

A CQI, a PMI, or both, may be associated with a wideband or a subband over which a UE 115 communicates. For example, a wideband CQI may be associated with a system bandwidth (e.g., a carrier bandwidth) over which the UE 115 communicates, and a subband CQI may be associated with a portion of the system bandwidth (e.g., a subband, a BWP) over which the UE 115 communicates. That is, a wideband CQI may represent a highest MCS that may be used for wideband communications, and a subband CQI may represent a highest MCS that may be used for communications on a particular subband. A wideband PMI may be associated with the system bandwidth, and a subband PMI may be associated with the portion of the system bandwidth (e.g., the subband, the BWP). That is, a wideband PMI may indicate a preference for which precoder matrix should be used for wideband communications, and a subband PMI may indicate a preference which precoder matrix should be used for communications on a particular subband.

A UE 115 may be configured to report CSI according to various timings. For example, the UE 115 may be configured to transmit a CSI report periodically, aperiodcially, or in accordance with an SPS scheme. In some examples, the UE 115 may transmit a periodic CSI report on a PUCCH. In some examples, the UE 115 may transmit an SPS CSI report on a PUCCH or on a physical uplink shared channel (PUSCH). In some examples, the UE 115 may be triggered by an uplink grant to transmit an aperiodic CSI report on a PUSCH. In some other examples, the UE 115 may be triggered by a downlink grant (e.g., included in downlink control information (DCI) or groupcast-DCI (GC-DC)) to transmit an aperiodic CSI report on a PUCCH. In some examples, a UE 115 may generate CSI based on a CSI-RS. In some other examples, the UE 115 may generate CSI based on decoding a PDSCH or a physical downlink control channel (PDCCH) (e.g., DMRSs included in the PDSCH or PDCCH).

A UE 115 may be configured to provide HARQ feedback and CSI in same or different resources. For example, the UE 115 may receive a downlink grant that schedules a PDSCH transmission and one or more PUCCH resources for transmission of HARQ feedback and CSI. In some cases, the downlink grant may schedule and configure the UE 115 to transmit HARQ feedback and CSI in a same PUCCH resource (e.g., multiplexed HARQ feedback and CSI). In some other cases, the downlink grant may schedule and configure the UE 115 with separate PUCCH resources for transmitting the HARQ feedback and the CSI.

In some cases, a UE 115 may delay (e.g., defer) a transmission of HARQ feedback, a CSI report, or both. For example, the UE 115 may communicate with a base station 105 in accordance with an SPS scheme and a TDD scheme. In some examples, the UE 115 may receive and decode a downlink message (e.g., a PDSCH transmission, a PDCCH transmission) and may generate HARQ feedback and a CSI report based on the downlink message. The UE 115 may be configured to transmit the HARQ feedback and the CSI report at some time after the downlink message in accordance with the SPS scheme (e.g., a configured quantity of slots after receiving the downlink message). However, the configured time (e.g., slot) for transmitting the HARQ feedback and the CSI report may coincide with a downlink slot of the TDD scheme. Accordingly, the UE 115 may be configured to delay transmitting the HARQ feedback and the CSI report, for example, until a next available uplink slot of the TDD scheme. In some cases, however, the UE 115 may accumulate additional HARQ feedback and CSI before the next available uplink slot, which may cause a payload of the accumulated HARQ feedback and CSI to exceed a payload size of an uplink grant (e.g., of a PUCCH resource) for transmitting the accumulated HARQ feedback and CSI.

Wireless communications system 100 may support techniques that enable a UE 115 to modify (e.g., adjust, change, select) CSI that is included in a CSI report when a transmission of the CSI report is delayed. For example, based on a quantity of occasions that the UE 115 delays transmitting the CSI report, the UE 115 may modify the CSI included in the CSI report. In some examples, modifying the CSI included in CSI report may include dropping one or more CSI types from the CSI report. For example, the UE 115 may drop a DMRS RSRP, a wideband CQI, a subband CQI, a wideband PMI, a subband PMI, a rank indicator, or a combination thereof, from the CSI report based on the quantity of CSI report delays (e.g., deferrals). In some examples, the UE 115 may drop transmission of the CSI report, for example, if the UE 115 delays transmitting the CSI report a threshold quantity of times. The UE 115 may transmit the CSI report including the modified CSI (e.g., the reduced quantity of CSI) to a communication device (e.g., a base station 105, another UE 115). In some cases, modifying the CSI may enable the UE 115 to transmit the CSI report with a payload size that that satisfies (e.g., is less than, is less than or equal to) a payload size of an uplink grant for transmitting the CSI report.

Figure 2:
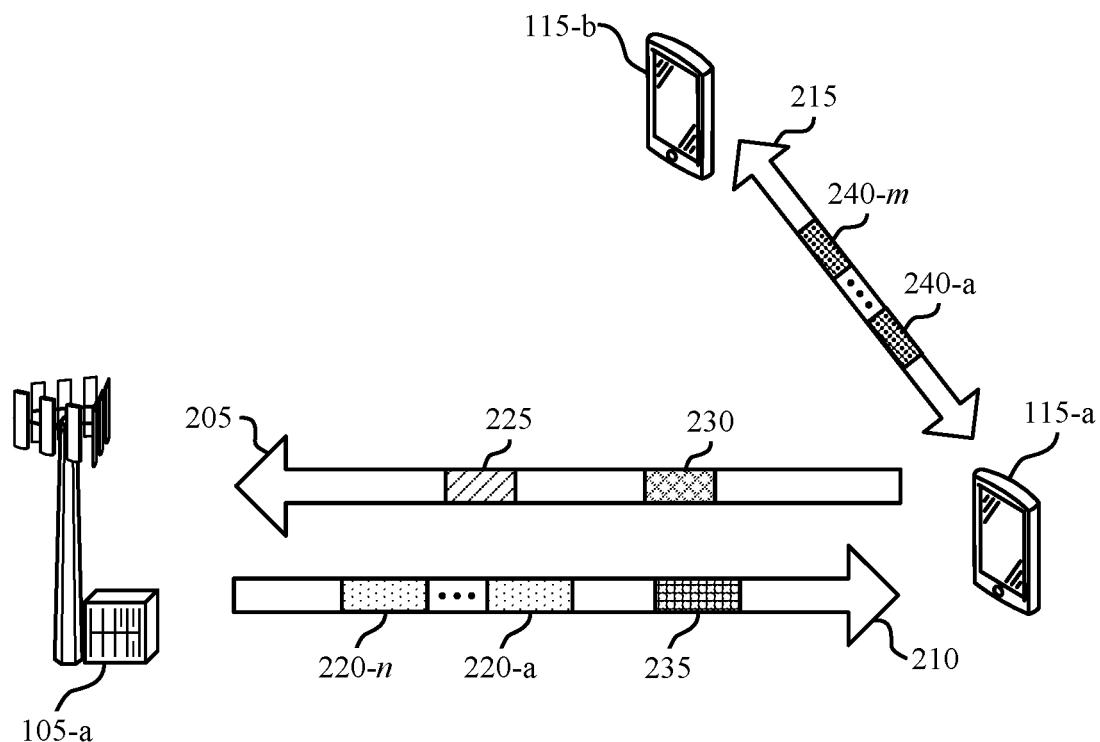
Figure 2:
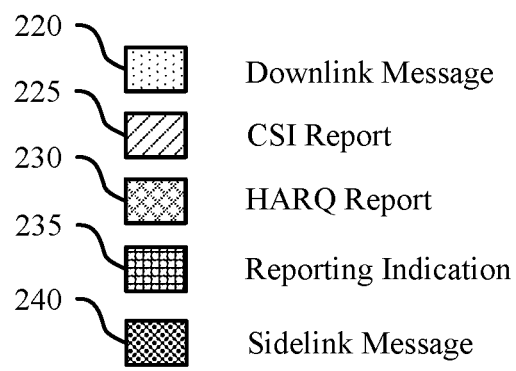

FIG. 2 illustrates an example of a wireless communications system 200 that supports techniques for modifying CSI in accordance with aspects of the present disclosure. The wireless communications system 200 may implement or be implemented by aspects of the wireless communications system 100 described with reference to FIG. 1. For example, the wireless communications system 200 may include a base station 105-a, a UE 115-a, and a UE 115-b, which may be examples of the corresponding devices described with reference to FIG. 1. The wireless communications system 200 may support the modification of CSI report content, which may provide improvements to resource utilization efficiency, power consumption, latency, spectral efficiency, data rates, battery life, coordination between devices, and processing capability, among other benefits.

The wireless communications system 200 may support communications between the base station 105-a and the UE 115-a. For example, the base station 105-a may transmit downlink messages to the UE 115-a over a communication link 205, and the UE 115-a may transmit uplink messages to the base station 105-a over communication link 210. The communication link 205 and the communication link 210 may be examples of a communication link 125 described with reference to FIG. 1. The wireless communications system 200 may also support communications between the UE 115-a and the UE 115-b. For example, the UE 115-a and the UE 115-b may communicate sidelink messages over a sidelink 215, which may be an example of a D2D communication link 135 described with reference to FIG. 1.

The wireless communications system 200 may support the communication of CSI between the base station 105-a and the UE 115-a. For example, the base station 105-a may transmit a downlink message 220-a to the UE 115-a (e.g., over a PDSCH, over a PDCCH) that is associated with reporting CSI between the base station 105-a and the UE 115-a. That is, the UE 115-a may receive the downlink message 220-a and generate CSI based on one or more measurements of the downlink message 220-a. The UE 115-a may generate a CSI report 225 corresponding to the downlink message 220-a that includes the generated CSI. In some examples, the types of CSI included in the CSI report 225 may initially include a measured DMRS RSRP of the downlink message 220-a, a wideband PMI, a subband PMI, a wideband CQI, a subband CQI, a rank indicator, or a combination thereof. That is, the UE 115-a may initially generate the CSI report 225 to be a full CSI report. The UE 115-a may also generate a HARQ feedback report 230 corresponding to the downlink message 220-a. For example, based on whether the UE 115-a successfully receives and decodes the downlink message 220-a, the UE 115-a may generate an acknowledgement (ACK) or a negative ACK (NACK) and include the ACK or the NACK in the HARQ feedback report 230. The ACK may indicate a successful reception of the downlink message 220-a, and the NACK may indicate a failed reception of the downlink message 220-a.

The UE 115-a may delay transmitting the CSI report 225 to the base station 105-a. For example, the UE 115-a and the base station 105-a may communicate according to an SPS scheme and a TDD scheme. The SPS scheme may indicate for the UE 115-a to transmit the CSI report 225 in a first downlink slot of the TDD scheme. As a result, the UE 115-a may delay (e.g., defer) transmitting the CSI report 225 until a next available uplink slot for transmission of the CSI report 225. In some examples, the SPS scheme may also indicate for the UE 115-a to transmit the HARQ feedback report 230 in a downlink slot of the TDD scheme (e.g., a same downlink slot as the CSI report 225, a different downlink slot). Here, the UE 115-a may delay transmitting the HARQ feedback report 230 until a next available uplink slot for transmission of the HARQ feedback report 230.

In some examples, the UE 115-a may accumulate additional HARQ feedback and CSI based on delaying transmitting the CSI report 225 and the HARQ feedback report 230. For example, the UE 115-a may receive one or more additional downlink messages 220 (e.g., through a downlink message 220-n) from the base station 105-a before the next available uplink slot. In response, the UE 115-a may generate additional corresponding HARQ feedback reports 230 and CSI reports 225. In some examples, the UE 115-a may generate fewer CSI reports 225 than HARQ feedback reports 230. For example, the UE 115-a may be configured to generate a CSI report 225 for a given downlink message 220 in response to generating a NACK for the downlink message 220 (e.g., configured for NACK-only CSI generation and reporting). In some cases, the UE 115-a may accumulate (e.g., combine) the generated CSI into a single CSI report 225 and the generated HARQ feedback into a single HARQ feedback report 230. In some cases, the UE 115-a may generate separate HARQ reports 230 and CSI reports 225 corresponding to the downlink messages 220.

The UE 115-a may be configured to modify the CSI included in a CSI report 225 (e.g., the single CSI report 225, the separate CSI reports 225) based on delaying the transmission of the CSI report 225. For example, delaying the transmission of the CSI report 225 may trigger the UE 115-a to modify the included CSI (e.g., modify the contents of the initially generated CSI). To modify the included CSI, the UE 115-a may drop one or more of the types of CSI included in the CSI report 225. For example, the UE 115-a may drop one or more of the DMRS RSRP, the wideband PMI, the subband PMI, the wideband CQI, the subband CQI, or the rank indicator from the CSI report 225 in response to delaying transmission of the CSI report 225.

The UE 115-a may modify the CSI included in the CSI report 225 based on a quantity of occasions that the UE 115-a delays transmitting the CSI report 225. For example, the UE 115-a may be configured to drop a first subset of CSI types from the CSI report 225 after a first deferral (e.g., a first occasion that the UE 115-a delays transmitting the CSI report 225), a second subset of CSI types from the CSI reports 225 after a second deferral, and so on. In some cases, the UE 115-a may be configured to drop transmission of the CSI report 225 if a quantity of deferrals satisfies (e.g., meets, equals) a threshold quantity of deferrals. In some examples, the UE 115-a may drop a respective subset of CSI types from the CSI report 225 after each deferral. In some other examples, the UE 115-a may wait to drop the respective subsets of CSI types until transmission of the CSI report 225. For example, the UE 115-a may determine a total quantity of deferrals, determine the corresponding subsets of CSI types to drop from the CSI report 225 based on the total quantity of deferrals, and drop the corresponding subsets of CSI types from the CSI report 225.

In some examples, if the UE 115-a has accumulated and generated multiple CSI reports 225, the UE 115-a may modify each CSI report 225 according to a respective quantity of occasions that the UE 115-a delayed each CSI report 225.

In some examples, the UE 115-a may modify the CSI included in a CSI report 225 based on a priority of a corresponding downlink message 220 (e.g., the downlink message 220-a), a quality of service (QOS) of the corresponding downlink message 220, or a combination thereof. For example, as a priority or a QoS of the corresponding downlink message 220 increases, the UE 115-a may be configured to drop fewer CSI types with each deferral, or vice versa. In some examples, if the priority satisfies (e.g., meets or exceeds) a threshold priority, the QoS satisfies (e.g., meets or exceeds a threshold QoS, or both, the UE 115-a may refrain from dropping one or more CSI types from the CSI report 225. In some examples, the UE 115-a may be configured to keep all of the CSI included in the CSI report 225 (e.g., initially generated for the CSI report 225) if the priority satisfies the threshold priority, the QOS satisfies the threshold QoS, or both.

In some examples, the UE 115-a may be configured to modify the CSI included in the CSI report 225 according to a set of dropping rules (e.g., preconfigured at the UE 115-a, configured by the base station 105-a). For example, the dropping rules may indicate for the UE 115-a to drop the first subset of CSI types after the first deferral, the second subset of CSI types after the second deferral, and so on (e.g., where each subset of CSI types may be based on a priority, QoS, or both, of a downlink message 220).

In some examples, the base station 105-*a* may indicate a reporting configuration that the UE 115-*a* uses to modify the CSI. For example, the base station 105-*a* may transmit a reporting indication 235 to the UE 115-*a* (e.g., via DCI, RRC signaling, a MAC-control element (MAC-CE)). In some examples, the reporting indication 235 may indicate a sequence of reporting configurations for a CSI report 225 (e.g., a ReportConfig1, a ReportConfig2, a ReportConfig3, and so on), where each reporting configuration of the sequence indicates a respective set of CSI types to include in or drop from the CSI report 225. For example, the ReportConfig1 may indicate for the UE 115-*a* to transmit a full CSI report (e.g., include all of the initially generated CSI), the ReportConfig2 may indicate for the UE 115-*a* to drop the first subset of CSI types, the ReportConfig3 may indicate for the UE 115-*a* to drop the first subset of CSI types and a second subset of CSI types, and so on. The UE 115-*a* may select a reporting configuration from the sequence based on the quantity of deferrals of the CSI report 225. For example, the UE 115-*a* may select the ReportConfig1 if the UE 115-*a* does not defer (e.g., delay) transmitting the CSI report 225, the ReportConfig2 if the UE 115-*a* defers the CSI report 225 once, the ReportConfig3 if the UE 115-*a* defers the CSI report 225 twice, and so on. Accordingly, based on the quantity of deferrals, the UE 115-*a* may select the reporting configuration from the sequence and modify the CSI in accordance with the selected reporting configuration.

In some other examples, the reporting indication 235 may indicate a reporting configuration for a CSI report 225 that includes multiple options for CSI modification. For example, the reporting configuration may include multiple sets of CSI types to include or drop from the CSI report 225. For instance, the reporting configuration may include a first set of CSI types to include in or drop from the CSI report 225 (e.g., corresponding to a full CSI report), a second set of CSI types to include in or drop from the CSI report 225, and so on. The UE 115-*a* may select a set of CSI types indicated by the reporting configuration based on the quantity of deferrals of the CSI report 225. For example, the UE 115-*a* may select the first set of CSI types if the UE 115-*a* does not defer (e.g., delay) transmitting the CSI report 225, the second set of CSI types if the UE 115-*a* defers the CSI report 225 once, and so on. Accordingly, based on the quantity of deferrals, the UE 115-*a* may select a set of CSI types indicated by the reporting configuration and modify the CSI in accordance with the selected set of CSI types.

The UE 115-*a* may transmit the CSI report 225 including the modified CSI to the base station 105-*a* (e.g., the single CSI report 225, the separate CSI reports 225). The UE 115 may also transmit the HARQ feedback report 230 to the base station 105-*a* (e.g., the single HARQ feedback report 230, the separate HARQ feedback reports 230). In some examples, the UE 115-*a* may transmit the CSI report 225 and the HARQ feedback report 230 in separate uplink resources. In some other examples, the UE 115-*a* may transmit the CSI report 225 and the HARQ feedback report 230 in a same uplink resource. Here, the UE 115-*a* may multiplex the CSI report 225 and the HARQ feedback report 230 in the same uplink resource. In some examples, the UE 115-*a* may modify the CSI included in the CSI report 225 such that a payload size of the multiplexed HARQ feedback report 230 and the CSI report 225 satisfies (e.g., is less than, is less than or equal to) a threshold payload size associated the same uplink resource. That is, the UE 115-*a* may drop CSI from the CSI report 225 such that the UE 115-*a* may multiplex the CSI included in the CSI report 225 and the HARQ feedback included in the HARQ feedback report 230 in the same uplink resource while satisfying the threshold payload size.

In some examples, the described techniques may be adapted and applied to support the modification of CSI included in a CSI report 225 that is communicated between the UE 115-*a* and the UE 115-*b*. For example, the UE 115-*b* may transmit one or more sidelink messages 240 to the UE 115-*a* (e.g., a sidelink message 240-*a* through a sidelink message 240-*m*), and the UE 115-*a* may generate one or more CSI reports 225 corresponding to the one or more sidelink messages 240. The UE 115-*a* may delay transmitting the one or more CSI reports 225 on one or more occasions, for example, due to collisions between sidelink resource allocations (e.g., allocated according to a Mode 1 resource allocation mode) or between sidelink resource reservations (e.g., reserved according to a Mode 2 resource allocation mode). Based on the quantity of occasions that the UE 115-*a* delays transmitting the one or more CSI reports 225 to the UE 115-*b*, the UE 115-*a* may modify CSI included in the one or more CSI reports 225 (e.g., drop one or more CSI types from the one or more CSI reports 225). The UE 115-*a* may then transmit the one or more CSI reports 225 that include the modified CSI to the UE 115-*b*.

Figure 3:
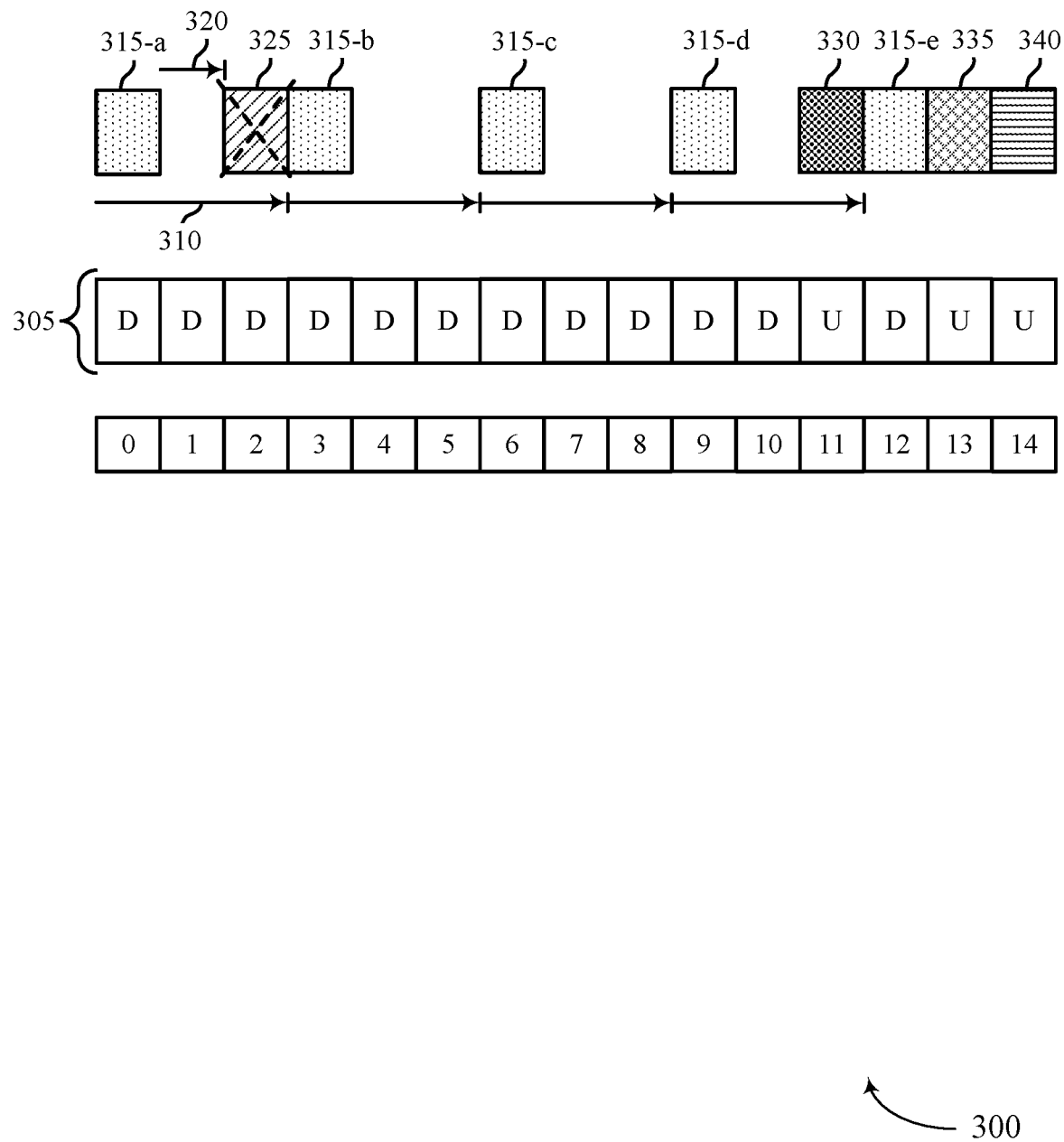
FIGS. 3 and 4 illustrate examples of communication diagrams that support techniques for modifying CSI in accordance with aspects of the present disclosure.

FIG. 3 illustrates an example of a communication diagram 300 that supports techniques for modifying CSI in accordance with aspects of the present disclosure. The communication diagram 300 may implement or be implemented by aspects of the wireless communications systems 100 and 200 as described with reference to FIGS. 1 and 2, respectively. For example, the communication diagram 300 may be implemented by a UE 115 to support CSI report content modification when delaying transmission of a CSI report.

The communication diagram 300 depicts a set of slots 305 during which a UE 115 may communicate with a base station 105. The set of slots 305 may be configured in accordance with a TDD scheme. For example, each slot may be configured as downlink slots or uplink slots. In the example of FIG. 3, the UE 115 and the base station 105 may communicate over fifteen slots that are indexed from 0 to 14. Slots 0 through 11 and 12 may be downlink slots, and slots 11, 13 and 14 may be uplink slots. Accordingly, the UE 115 and the base station 105 may communicate downlink messages during the downlink slots and uplink messages during the uplink slots.

The UE 115 and the base station 105 may also communicate in accordance with an SPS scheme. For example, the SPS scheme may indicate a periodicity 310 of PDSCH occasions 315. The SPS scheme may also indicate a period 320 after a given PDSCH occasion 315 that a corresponding PUCCH occasion occur. In the example of FIG. 3, the periodicity 310 may indicate that a PDSCH occasion 315 occurs every three slots, and the period 320 may indicate that a PUCCH occasion occurs one slot after each PDSCH occasion 315. For example, in accordance with the SPS scheme, a PDSCH occasion 315-*a* may occur during slot 0, a PDSCH occasion 315-*b* may occur during slot 3, a PDSCH occasion 315-*c* may occur during slot 6, a PDSCH occasion 315-*d* may occur during slot 9, and a PDSCH occasion 315-*e* may occur during slot 12. Additionally, in accordance with the SPS scheme, a PUCCH occasion may occur in each of slots 2, 5, 8, 11 and 14. In some examples, the UE 115 may also be scheduled with a PUCCH occasion during slot 13, for example, based on slot 13 being an uplink slot.

The base station 105 may transmit a first downlink message to the UE 115 during the PDSCH occasion 315-*a*, and the UE 115 may generate a CSI report 325 based on (e.g., corresponding to) the first downlink message. The CSI report 325 may correspond to a full CSI report. For example, the CSI report 325 may include a DMRS RSRP of the first downlink message, a wideband PMI, a subband PMI, a wideband CQI, a subband CQI, and a rank indicator (e.g., among other types of CSI). The UE 115 may be scheduled to transmit the CSI report during the PUCCH occasion of slot 2 (e.g., after the period 320) based on the SPS scheme. However, slot 2 may be a downlink slot, which may cause the UE 115 to delay transmitting the CSI report 325.

The UE 115 may delay transmitting the CSI report 325 until a next available uplink slot of the set of slots 305. In some examples, the next available uplink slot may be a next uplink slot of the set of slots 305 after slot 2 (e.g., slot 11). In some examples, the next available uplink slot may be a later uplink slot of the set of slots 305 after the next uplink slot (e.g., slot 13 or slot 14). For example, the UE 115 may delay transmitting the CSI report 325 more than once (e.g., two times, three times, and so on). That is, the UE 115 may be configured (e.g., scheduled) to delay the CSI report 325 until the next uplink slot as a result of the SPS scheme and TDD scheme collision, but may perform subsequent delays (e.g., deferrals) of the CSI report 325 until later uplink slots. In some examples, the UE 115 may delay transmitting the CSI report 325 multiple times due to transmitting other uplink messages during uplink slots of the TDD scheme. For example, the UE 115 may be scheduled to transmit the another uplink message (e.g., carrying uplink data, uplink control information, HARQ feedback, and the like) during the next uplink slot of the TDD scheme, which may cause the UE 115 to further delay transmitting the CSI report 325.

Based on delaying the CSI report 325, the UE 115 may accumulate multiple CSI reports before the occurrence of the next available uplink slot. For example, the base station 105 may transmit additional downlink messages in one or more of the PDSCH occasions 315-*b*, 315-*c*, and 315-*d*. The UE 115 may generate additional CSI reports (e.g., full CSI reports) corresponding to the additional downlink messages. Additionally, the UE 115 may generate HARQ feedback (e.g., an ACK, a NACK) corresponding to the first downlink message and may generate and accumulate additional HARQ feedback corresponding to the additional downlink messages. Accordingly, by the occurrence of next uplink slot (e.g., slot 11), the UE 115 may have accumulated HARQ feedback and CSI corresponding to multiple downlink messages. In some examples, the UE 115 may prioritize the transmission of the generated HARQ feedback, which may cause the UE 115 to delay transmitting the CSI report 325 (e.g., and the other generated CSI reports) until a subsequent uplink slot after the next uplink slot, for example, if a payload size of an uplink grant of the next uplink slot (e.g., slot 11) is insufficient to transmit the generated HARQ feedback and the CSI report 325. In some examples, the HARQ feedback may include the CSI report 325, which may be referred to as multi-bit HARQ feedback, turbo-HARQ, or some other terminology. In such cases, the HARQ feedback may include a number of bits associated with HARQ and an additional number of bits for the CSI report 325 within a same message.

The UE 115 may modify the CSI included in the CSI report 325 based on the number of times that the CSI report 325 is deferred. That is, the UE 115 may modify the CSI included in the CSI report 325 based on the quantity of occasions that the UE 115 delayed the scheduled transmission of the CSI report 325 (e.g., until a next uplink slot). For example, the UE 115 may drop one or more types of CSI from the CSI report 325 with each deferral. In an example, the UE 115 may be configured to drop the DMRS RSRP from the CSI report 325 in response to a first deferral (e.g., the initial deferral) to the next uplink slot (e.g., slot 11). Accordingly, after the first deferral, CSI report 325 may include the wideband PMI, the subband PMI, the wideband CQI, the subband CQI, and the rank indicator and may be represented as a CSI report 330. In response to a second deferral (e.g., to slot 13), the UE 115 may be configured to drop subband CSI from the CSI report 330. Accordingly, after the second deferral, the CSI report 330 may include the wideband PMI, the wideband CQI, and the rank indicator and may be represented as a CSI report 335. In some examples, the UE 115 may be configured to drop the wideband PMI and the rank indicator in response to a third deferral (e.g., to slot 14). Accordingly, after the third deferral, the CSI report 335 may include the wideband CQI and may be represented as a CSI report 340. In some other examples, the UE 115 may be configured to drop transmission of the CSI report 335 in response to the third deferral. For example, the UE 115 may be configured with a threshold quantity of deferrals such that if the UE 115 defers a CSI report the threshold quantity of deferrals (e.g., or more than the threshold quantity of deferrals), the UE 115 may drop transmission of the CSI report. For instance, the UE 115 may be configured with a threshold quantity of three deferrals. Here, the UE 115 may drop transmission of the CSI report 335 in response to the third deferral to slot 14. The threshold quantity of deferrals may be any quantity of deferrals. For example, if the threshold quantity of deferrals is four, the UE 115 may be configured to drop transmission of the CSI report 340 if the CSI report 340 is deferred.

In some examples, different CSI report types may be associated with different quantities of deferrals. For example, a CSI report type 0 may correspond to a non-deferred CSI report that is a full CSI report. For instance, the CSI report 325 may have a CSI report type 0. A CSI report type 1 may correspond to a once-deferred CSI report (e.g., the CSI report 330), a CSI report type 2 may correspond to a twice-deferred CSI report (e.g., the CSI report 335), a CSI report type 3 may correspond to a thrice-deferred CSI report (e.g., the CSI report 340), and so on. Each CSI report type may indicate which CSI to include in or drop from a CSI report having the CSI report type.

In some examples, the UE 115 may be configured with a sequence of reporting configurations that each correspond to a different CSI report type. For example, the base station 105 may configure the UE 115 with a sequence of the CSI report type 0, the CSI report type 1, the CSI report type 2, the CSI report type 3, and a CSI report type 4, where the CSI report type 4 may correspond to a four-times deferred CSI report and indicate a dropping of the CSI report (e.g., based on the threshold quantity of deferrals). The UE 115 may select a CSI report type of the sequence for transmitting a CSI report based on the number of times the CSI report is deferred. For example, if the CSI report 325 is deferred twice, the UE 115 may select the CSI report type 2 and drop the DMRS RSRP and the subband CSI from the CSI report 325 in accordance with the CSI report type 2 to generate the CSI report 335. In some other examples, the base station 105 may configure the UE 115 with a reporting configuration that includes multiple CSI report types (e.g., the CSI report type 0, the CSI report type 1, and so on). Here, the UE 115 may select a CSI report type from the multiple CSI report types for transmitting a CSI report based on the number of times that the CSI report is deferred.

In some examples, the UE 115 may prioritize transmitting earlier generated CSI reports over later generated CSI reports. For example, the UE 115 accumulate the CSI report 325 and the additional CSI reports corresponding to the additional downlink messages. Each of the CSI report 325 and the additional CSI reports may be deferred one time until the next uplink slot (e.g., slot 11). In some cases, however, a payload size of the next uplink slot may be insufficient to transmit the CSI report 325 and the additional CSI reports. Accordingly, the UE 115 may select later generated CSI reports (e.g., of the additional CSI reports) to further delay and prioritize transmitting the CSI report 325 (e.g., and other earlier generated CSI reports of the additional CSI reports) over the next uplink slot. In some other examples, the UE 115 may prioritize transmitting later generated CSI reports. For example, the UE 115 may select earlier generated CSI reports (e.g., the CSI report 325) to further delay and prioritize transmitting the later generated additional CSI reports over the next uplink slot. In some examples, the UE 115 may prioritize transmitting CSI reports that correspond to downlink messages associated with higher priorities. For example, the UE 115 may select CSI reports corresponding to relatively lower priority downlink messages (e.g., of the first downlink message and the additional downlink messages) to further delay and prioritize transmitting CSI reports corresponding to relatively higher priority downlink messages over the next uplink slot.

In some examples, the UE 115 may multiplex accumulated HARQ feedback and one or more accumulated CSI reports for transmission over an uplink slot. For example, the UE 115 may multiplex the accumulated HARQ feedback and the CSI report 330 to transmit over slot 11 (e.g., to avoid further delaying the CSI report 330). In some examples, the UE 115 may drop CSI types from the CSI report 325 to generate the CSI report 330 such that a payload size of the accumulated HARQ feedback and the CSI report 330 satisfies (e.g., is less than, is less than or equal to) a payload size of slot 11.

Figure 4:
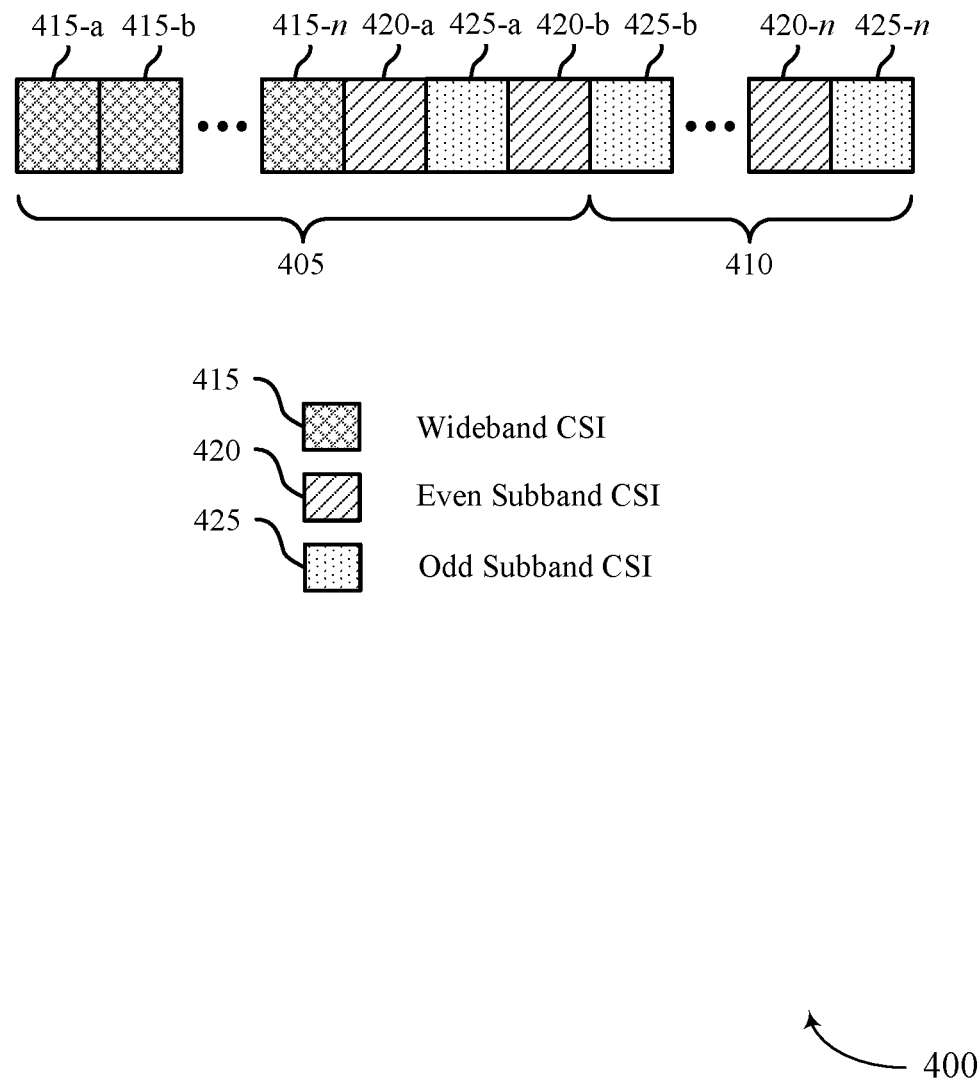

FIG. 4 illustrates an example of a communication diagram 400 that supports techniques for modifying CSI in accordance with aspects of the present disclosure. The communication diagram 400 may implement or be implemented by aspects of the wireless communications systems 100 and 200 as described with reference to FIGS. 1 and 2, respectively. For example, the communication diagram 400 may be implemented by a UE 115 to support the communication of CSI reports that include modified CSI.

The communication diagram 400 depicts a set of reported CSI 405 and a set of dropped CSI 410. For example, in some cases, the UE 115 may be scheduled to transmit multiple CSI reports over a same uplink resource. For instance, the UE 115 may defer multiple CSI reports to a next uplink slot and may thus be configured to transmit the multiple deferred CSI reports over the same uplink slot. Additionally, or alternatively, the UE 115 may be scheduled to transmit one or more periodic CSI report or aperiodic CSI reports over a same uplink slot as one or more deferred CSI reports. In some cases, however, a payload size of the uplink resource may be insufficient to carry the CSI of the multiple CSI reports. The UE 115 may drop CSI from the one or more deferred CSI reports based on a number of times that each CSI report is deferred. As a result, the UE 115 may be configured to drop CSI from the multiple CSI reports (e.g., the set of dropped CSI 410) such that the UE 115 may transmit the remaining CSI included in the multiple CSI reports (e.g., the set of reported CSI 405) over the uplink resource.

In some examples, the UE 115 may be configured to prioritize transmitting CSI reports from the multiple CSI reports according to a time-domain behavior and physical channel associated with each CSI report. For example, the UE 115 may be configured to prioritize more dynamic reports over less dynamic reports. For instance, the UE 115 may prioritize aperiodic CSI reports over SPS CSI reports and periodic CSI reports and prioritize SPS CSI reports over periodic CSI reports. The multiple CSI reports may be further prioritized based on CSI content (e.g., if multiple CSI reports associated with a same time-domain behavior and physical channel are simultaneously scheduled). For example, the UE 115 may prioritize CSI reports including beam reports (e.g., layer 1-RSRP reporting) over other CSI reports. The multiple CSI reports may be further prioritized based on a serving cell associated with the CSI reports. For example, CSI reports associated with primary cells may be prioritized over CSI reports associated with secondary cells. The multiple CSI reports may be based on a reporting configuration associated with each CSI report. Accordingly, the UE 115 may prioritize CSI from the multiple CSI reports to multiplex on the uplink resource in accordance with such prioritization of the corresponding CSI report.

The UE 115 may be configured to prioritize wideband CSI included in the multiple CSI reports over subband CSI included in the CSI reports. For example, the UE 115 may map wideband CSI 415 from the multiple CSI reports to the most significant bits of the uplink resource followed by interlaced even subband CSI 420 and odd subband CSI 425 from the multiple CSI reports. For instance, the UE 115 wideband CSI 415-a corresponding to a first CSI report, wideband CSI 415-b corresponding to a second CSI report, up through wideband CSI 415-n corresponding to an nt CSI report to the most significant bits. Additionally, the UE 115 may map even subband CSI 420-a corresponding to the first CSI report to the next most significant bits, followed by odd subband CSI 425-a corresponding to the first CSI report, followed by even subband CSI 420-b corresponding to the second CSI report, followed by odd subband CSI 425-b corresponding to the second CSI report, and so on, through even subband CSI 420-n and odd subband CSI 425-n corresponding to the $n_{th}$ CSI report.

In some examples, the mapped wideband CSI 415, even subband CSI 420, and odd subband 425 may be based on whether a transmission of a corresponding CSI report was deferred. For example, if the first CSI report was delayed such that subband CSI was dropped from the first CSI report, the UE 115 may exclude mapping the even subband CSI 420-a and the odd subband CSI 425-a and may instead map the even subband CSI 420-b and the odd subband CSI 425-b to the next most significant bits of the uplink resource following the wideband CSI 415. Other mappings of CSI from multiple CSI reports based on CSI report modification may be performed in accordance with the techniques described herein.

The UE 115 may transmit the CSI from the multiple CSI reports to the base station 105 over the uplink resource in accordance with the mapping of the CSI to the bits. For example, the payload size of the uplink resource may enable the UE 115 to transmit CSI up to the even subband CSI 420-b to the base station 105 while dropping the odd subband CSI 425-b through the odd subband CSI 425-n.

Figure 5:
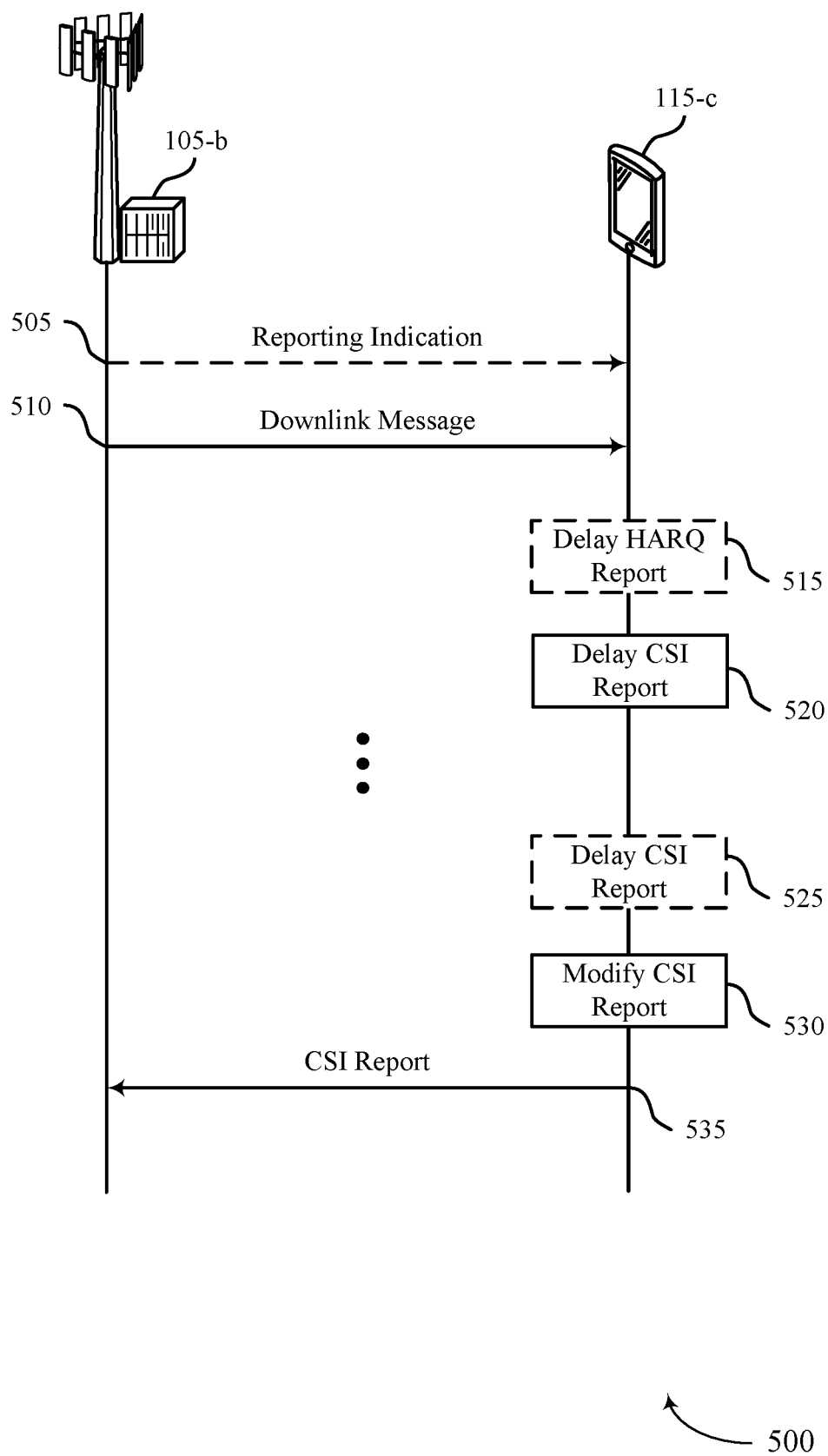
FIG. 5 illustrates an example of a process flow in a system that supports techniques for modifying CSI in accordance with aspects of the present disclosure.

FIG. 5 illustrates an example of a process flow 500 in a system that supports techniques for modifying CSI in accordance with aspects of the present disclosure. In some examples, the process flow 500 may implement or be implemented by aspects of a wireless communications system 100 and 200 as described with reference to FIGS. 1 and 2. For example, the process flow 500 may be implemented by a base station 105-b and a UE 115-c to support the CSI report content modification.

The base station 105-*b* and the UE 115-*c* may be examples of a base station 105 or a UE 115, as described with reference to FIGS. 1 through 4. In the following description of the process flow 500, the operations between the base station 105-*b* and the UE 115-*c* may be communicated in a different order than the example order shown, or the operations performed by the base station 105-*b* and the UE 115-*c* may be performed in different orders or at different times. Some operations may also be omitted from the process flow 500, and other operations may be added to the process flow 500. Further, although some operations or signaling may be shown to occur at different times for discussion purposes, these operations may actually occur at the same time.

At 505, the base station 105-*b* may transmit a reporting indication to the UE 115-*c*. The reporting indication may indicate a reporting configuration or a sequence of reporting configurations for reporting CSI to the base station 105-*b*. For example, the reporting configuration or the sequence of reporting configurations may indicate various sets of CSI types for the UE 115-*c* to include in a CSI report to the base station based on a quantity of occasions that the UE 115-*c* delays the CSI report. In some examples, the reporting indication may be an example of a reporting indication 235 described with reference to FIG. 2.

At 510, the base station 105-*b* may transmit a downlink message to the UE 115-*c*. In response to receiving the downlink message, the UE 115-*c* may generate CSI corresponding to the downlink message, such as a DMRS RSRP of the downlink message, a wideband CQI associated with the downlink message, a wideband PMI associated with the downlink message, a subband CQI associated with the downlink message, a subband PMI associated with the downlink message, a rank indicator associated with the downlink message, or a combination thereof. In some examples, the UE 115-*c* may additionally generate HARQ feedback, such as an ACK or a NACK, that indicates whether the UE 115-*c* successfully received and decoded the downlink message. In some examples, the UE 115-*a* may receive the downlink message from the base station 105-*b* over a downlink slot of a TDD scheme and over a PDSCH configured in accordance with an SPS scheme.

At 515, the UE 115-*c* may delay transmitting a HARQ report that includes the HARQ feedback. For example, a collision between the TDD scheme and the SPS scheme may cause the UE 115-*c* to delay transmitting the HARQ report until a next uplink slot of the TDD scheme.

At 520, the UE 115-*c* may delay transmitting a CSI report that includes the CSI. For example, the collision between the TDD scheme and the SPS scheme may also cause the UE 115-*c* to delay transmitting the CSI report until the next uplink slot.

In some examples, the UE 115-*c* may delay transmitting the CSI report more than one time. For example, at 525, the UE 115-*c* may delay the CSI report until a next uplink slot after the next uplink slot. For instance, the UE 115-*c* may be configured to transmit another uplink message (e.g., the HARQ report) over a PUCCH of the next uplink slot and a payload size of the PUCCH may be insufficient for the UE 115-*c* to transmit both the other uplink message and the CSI report. Accordingly, the UE 115-*c* may delay transmitting the CSI report until the next uplink slot after the next uplink slot. In some cases, the UE 115-*c* may continue to delay transmitting the CSI report until subsequent next uplink slots until an uplink slot is available for transmitting the CSI report.

At 530, the UE 115 may modify the CSI included in the CSI report based on the quantity of occasions that the UE 115 delayed the CSI report. For example, the UE 115 may drop one or more types of CSI from the CSI report based on the quantity of occasions. In some examples, the UE 115 may select a reporting configuration of the sequence of reporting configurations based on the quantity of occasions and may drop CSI from the CSI report in accordance with the selected reporting configuration. In some examples, the UE 115 may select a set of CSI types indicated by the reporting configuration based on the quantity of occasions and may drop CSI from the CSI report based on the selected set of CSI types.

At 535, the UE 115 may transmit the CSI report including the modified CSI report to the base station 105 using the next available uplink slot.

Figure 6:
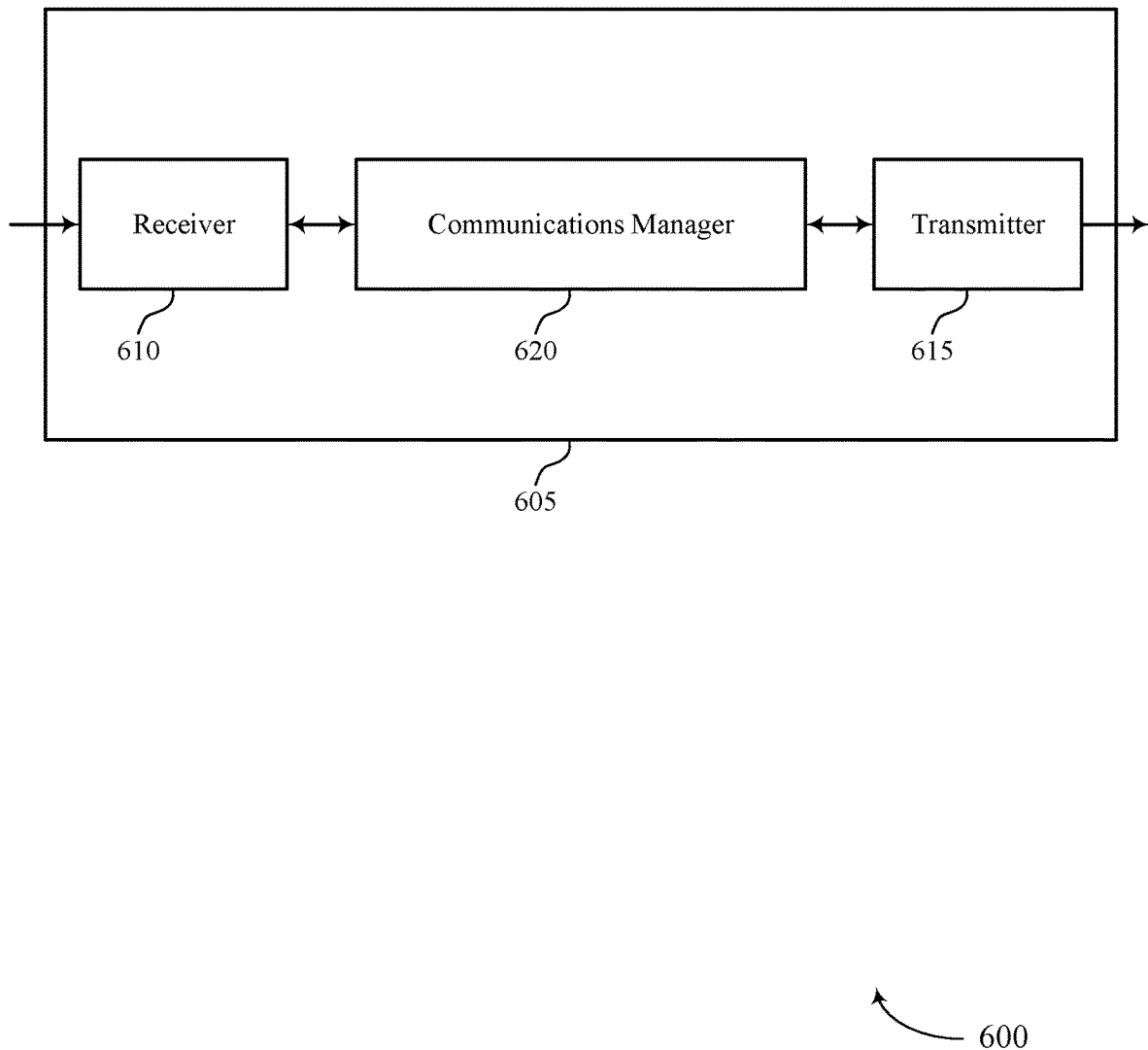
FIGS. 6 and 7 show block diagrams of devices that support techniques for modifying CSI in accordance with aspects of the present disclosure.

FIG. 6 shows a block diagram 600 of a device 605 that supports techniques for modifying CSI in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for modifying CSI). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for modifying CSI). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for modifying CSI as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, from a base station, one or more downlink messages associated with reporting CSI between the UE and the base station. The communications manager 620 may be configured as or otherwise support a means for modifying CSI included in a CSI report associated with the one or more downlink messages, the CSI being modified based on a quantity of occasions that a scheduled transmission of the CSI report is delayed. The communications manager 620 may be configured as or otherwise support a means for transmitting, to the base station, the CSI report including the modified CSI.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, and more efficient utilization of communication resources, for example, by supporting CSI report content modification and prioritization (e.g., when a CSI report transmission is delayed).

Figure 7:
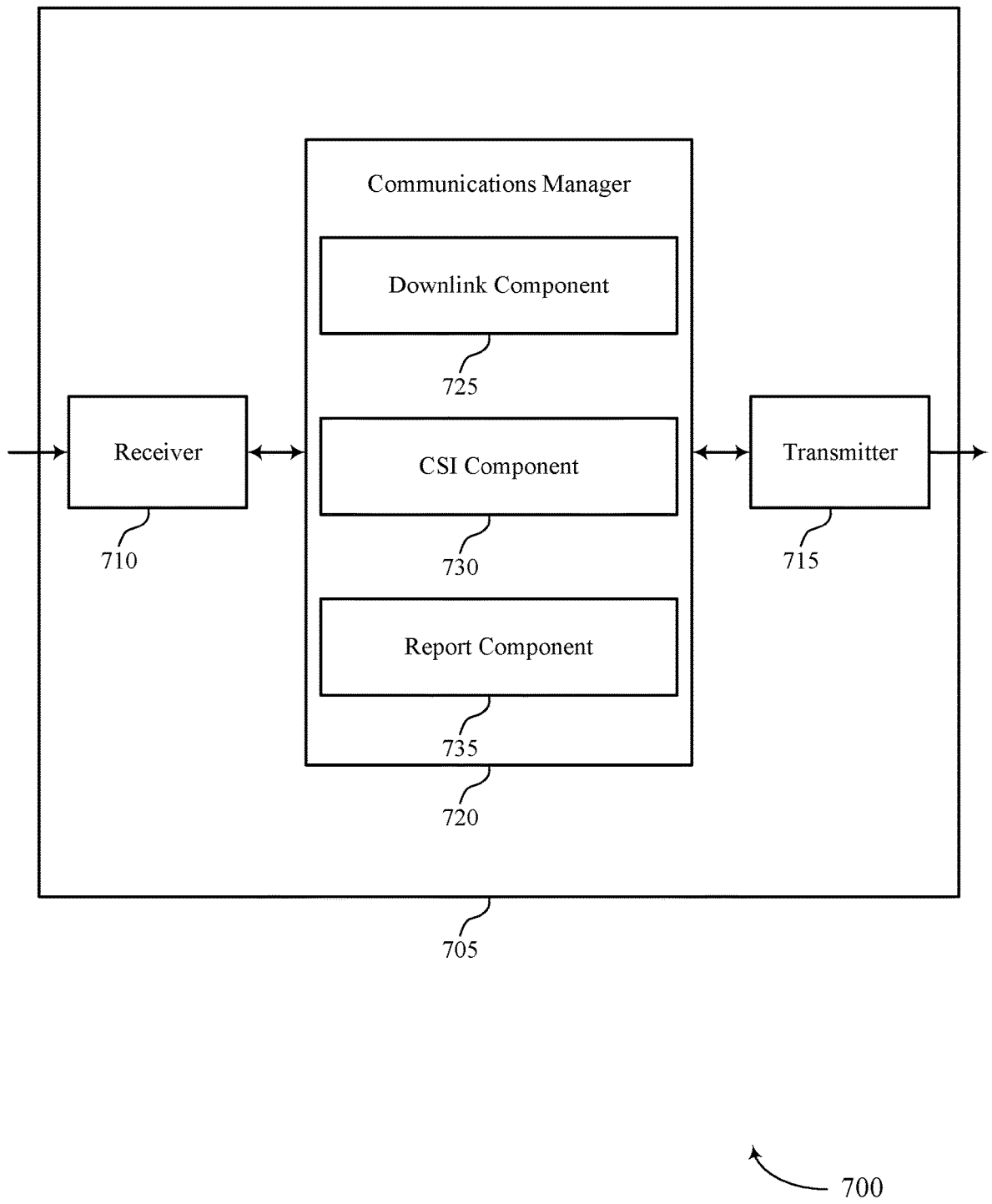

FIG. 7 shows a block diagram 700 of a device 705 that supports techniques for modifying CSI in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for modifying CSI). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for modifying CSI). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for modifying CSI as described herein. For example, the communications manager 720 may include a downlink component 725, a CSI component 730, a report component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The downlink component 725 may be configured as or otherwise support a means for receiving, from a base station, one or more downlink messages associated with reporting CSI between the UE and the base station. The CSI component 730 may be configured as or otherwise support a means for modifying CSI included in a CSI report associated with the one or more downlink messages, the CSI being modified based on a quantity of occasions that a scheduled transmission of the CSI report is delayed. The report component 735 may be configured as or otherwise support a means for transmitting, to the base station, the CSI report including the modified CSI.

Figure 8:
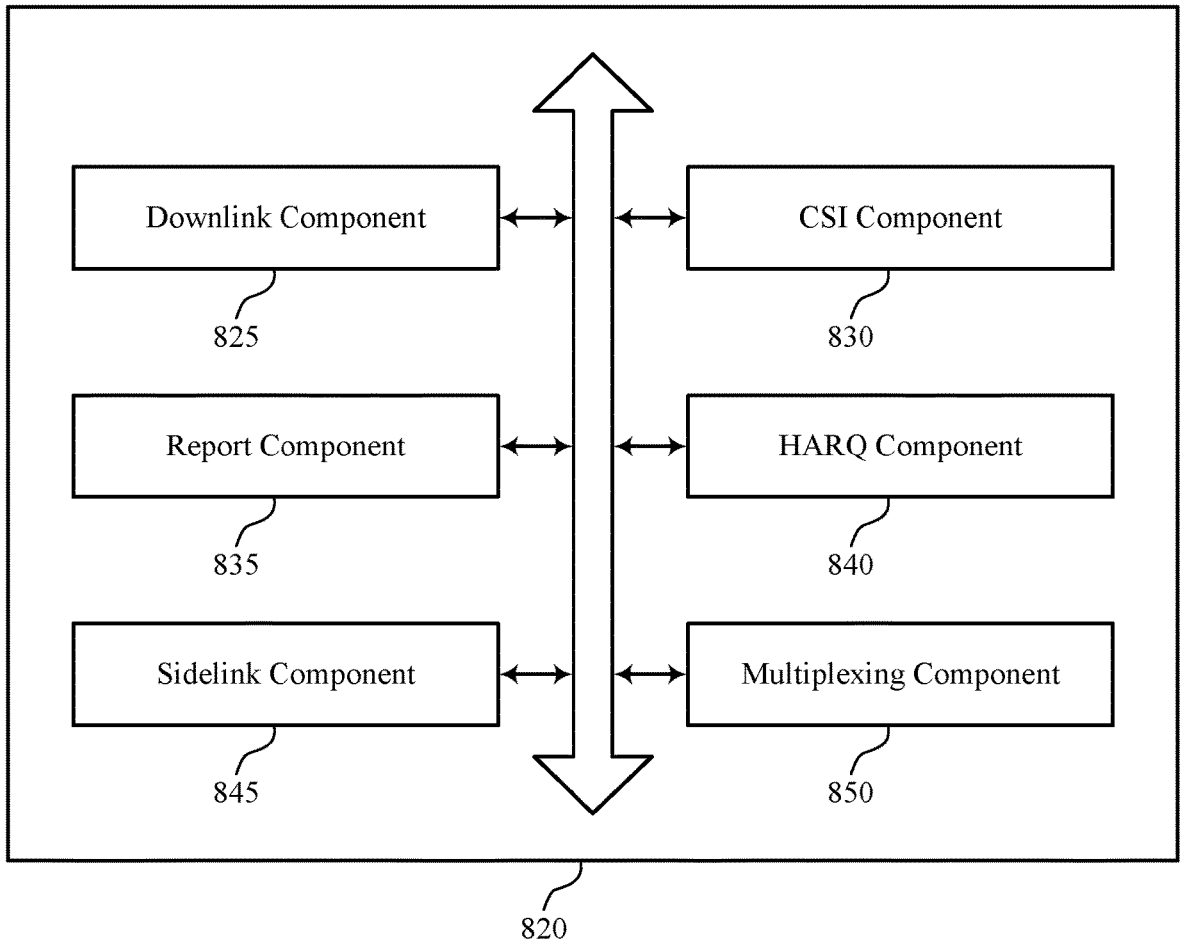
FIG. 8 shows a block diagram of a communications manager that supports techniques for modifying CSI in accordance with aspects of the present disclosure.

FIG. 8 shows a block diagram 800 of a communications manager 820 that supports techniques for modifying CSI in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for modifying CSI as described herein. For example, the communications manager 820 may include a downlink component 825, a CSI component 830, a report component 835, an HARQ component 840, a sidelink component 845, a multiplexing component 850, or any combination thereof. Each of these components may communicate, directly or indirectly, with one another (e.g., via one or more buses).

The communications manager 820 may support wireless communication at a UE in accordance with examples as disclosed herein. The downlink component 825 may be configured as or otherwise support a means for receiving, from a base station, one or more downlink messages associated with reporting CSI between the UE and the base station. The CSI component 830 may be configured as or otherwise support a means for modifying CSI included in a CSI report associated with the one or more downlink messages, the CSI being modified based on a quantity of occasions that a scheduled transmission of the CSI report is delayed. The report component 835 may be configured as or otherwise support a means for transmitting, to the base station, the CSI report including the modified CSI.

In some examples, to support modifying the CSI included in the CSI report, the CSI component 830 may be configured as or otherwise support a means for dropping one or more CSI types from the CSI report based on the quantity of occasions that the scheduled transmission of the CSI report is delayed.

In some examples, the one or more CSI types include a DMRS RSRP, a wideband PMI, a subband PMI, a wideband CQI, a subband CQI, a rank indicator, or a combination thereof.

In some examples, the downlink component 825 may be configured as or otherwise support a means for receiving, from the base station, one or more additional downlink messages associated with reporting second CSI between the UE and the base station. In some examples, the CSI component 830 may be configured as or otherwise support a means for dropping a transmission of a second CSI report associated with the one or more additional downlink messages based on a second quantity of occasions that a scheduled transmission of the second CSI report is delayed satisfying a threshold.

In some examples, the HARQ component 840 may be configured as or otherwise support a means for generating one or more HARQ feedback reports corresponding to the one or more downlink messages, one or more other downlink messages, or both, where the CSI is modified based on generating the one or more HARQ feedback reports. In some examples, the report component 835 may be configured as or otherwise support a means for transmitting the one or more HARQ feedback reports to the base station.

In some examples, the multiplexing component 850 may be configured as or otherwise support a means for multiplexing the one or more HARQ feedback reports and the CSI report including the modified CSI, where the one or more HARQ feedback reports and the CSI report are transmitted using a same uplink resource, and where the CSI is modified such that a payload size of the multiplexed one or more HARQ feedback reports and CSI report satisfies a threshold payload size.

In some examples, the CSI is modified based on a priority associated with the one or more downlink messages, a QoS associated with the one or more downlink messages, or a combination thereof.

In some examples, to support modifying the CSI included in the CSI report, the CSI component 830 may be configured as or otherwise support a means for refraining from dropping one or more CSI types from the CSI report based on the priority satisfying a threshold priority, the QoS satisfying a threshold QoS, or a combination thereof.

In some examples, the report component 835 may be configured as or otherwise support a means for receiving, from the base station, an indication of a sequence of reporting configurations for the CSI report, where each reporting configuration indicates a respective set of CSI types to include in the CSI report or drop from the CSI report. In some examples, the report component 835 may be configured as or otherwise support a means for selecting a reporting configuration from the sequence of reporting configurations based on the quantity of occasions that the scheduled transmission of the CSI report is delayed, where the CSI is modified in accordance with the selected reporting configuration.

In some examples, the report component 835 may be configured as or otherwise support a means for receiving, from the base station, an indication of a reporting configuration for the CSI report, where the reporting configuration includes a set of multiple sets of CSI types to include in the CSI report or drop from the CSI report. In some examples, the report component 835 may be configured as or otherwise support a means for selecting a set of CSI types from the plurality based on the quantity of occasions that the scheduled transmission of the CSI report is delayed, where the CSI is modified in accordance with the selected set of CSI types.

In some examples, the UE and the base station are configured to communicate in accordance with an SPS scheme and a TDD scheme. In some examples, the scheduled transmission of the CSI report is delayed based on a collision between a downlink slot of the TDD scheme and an uplink grant for transmitting the CSI report associated with the SPS scheme.

In some examples, the sidelink component 845 may be configured as or otherwise support a means for receiving, from a second UE, one or more sidelink messages associated with reporting CSI between the UE and the second UE. In some examples, the CSI component 830 may be configured as or otherwise support a means for modifying second CSI included in a second CSI report associated with the one or more sidelink messages, the CSI being modified based on a quantity of occasions that a scheduled transmission of the second CSI report is delayed. In some examples, the report component 835 may be configured as or otherwise support a means for transmitting, to the second UE, the second CSI report including the modified second CSI.

Figure 9:
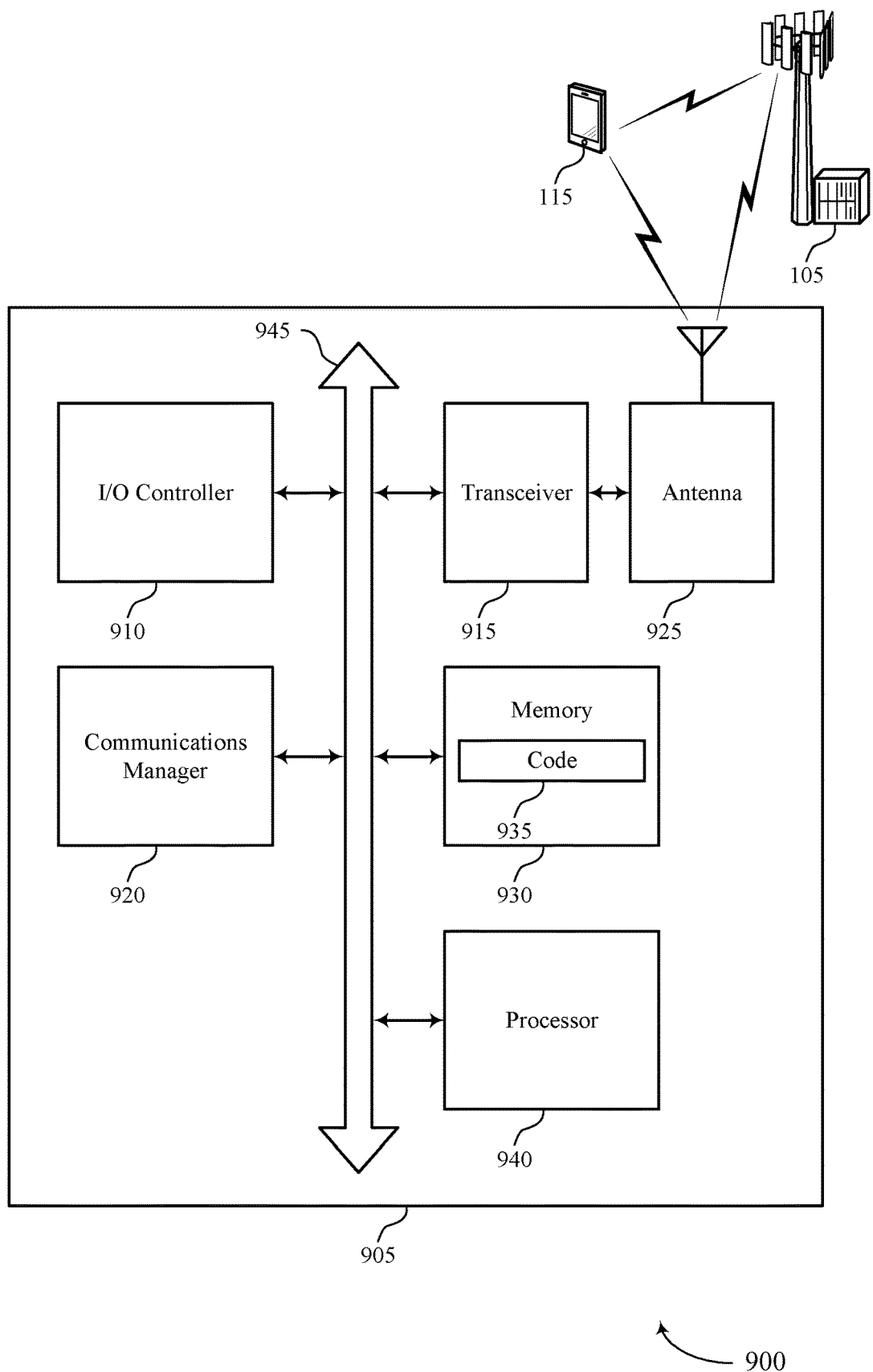
FIG. 9 shows a diagram of a system including a device that supports techniques for modifying CSI in accordance with aspects of the present disclosure.

FIG. 9 shows a diagram of a system 900 including a device 905 that supports techniques for modifying CSI in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for modifying CSI). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a base station, one or more downlink messages associated with reporting CSI between the UE and the base station. The communications manager 920 may be configured as or otherwise support a means for modifying CSI included in a CSI report associated with the one or more downlink messages, the CSI being modified based on a quantity of occasions that a scheduled transmission of the CSI report is delayed. The communications manager 920 may be configured as or otherwise support a means for transmitting, to the base station, the CSI report including the modified CSI.

By including or configuring the communications manager 920 in accordance with examples as described herein, the device 905 may support techniques for increased resource utilization efficiency, increased spectral efficiency, increased data rates, increased reliability, reduced latency, reduced power consumption, improved coordination between devices, longer battery life, and improved utilization of processing capability, among other benefits, by supporting the prioritization and modification of CSI report content.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for modifying CSI as described herein, or the processor 940 and the memory 930 may be otherwise configured to perform or support such operations.

Figure 10:
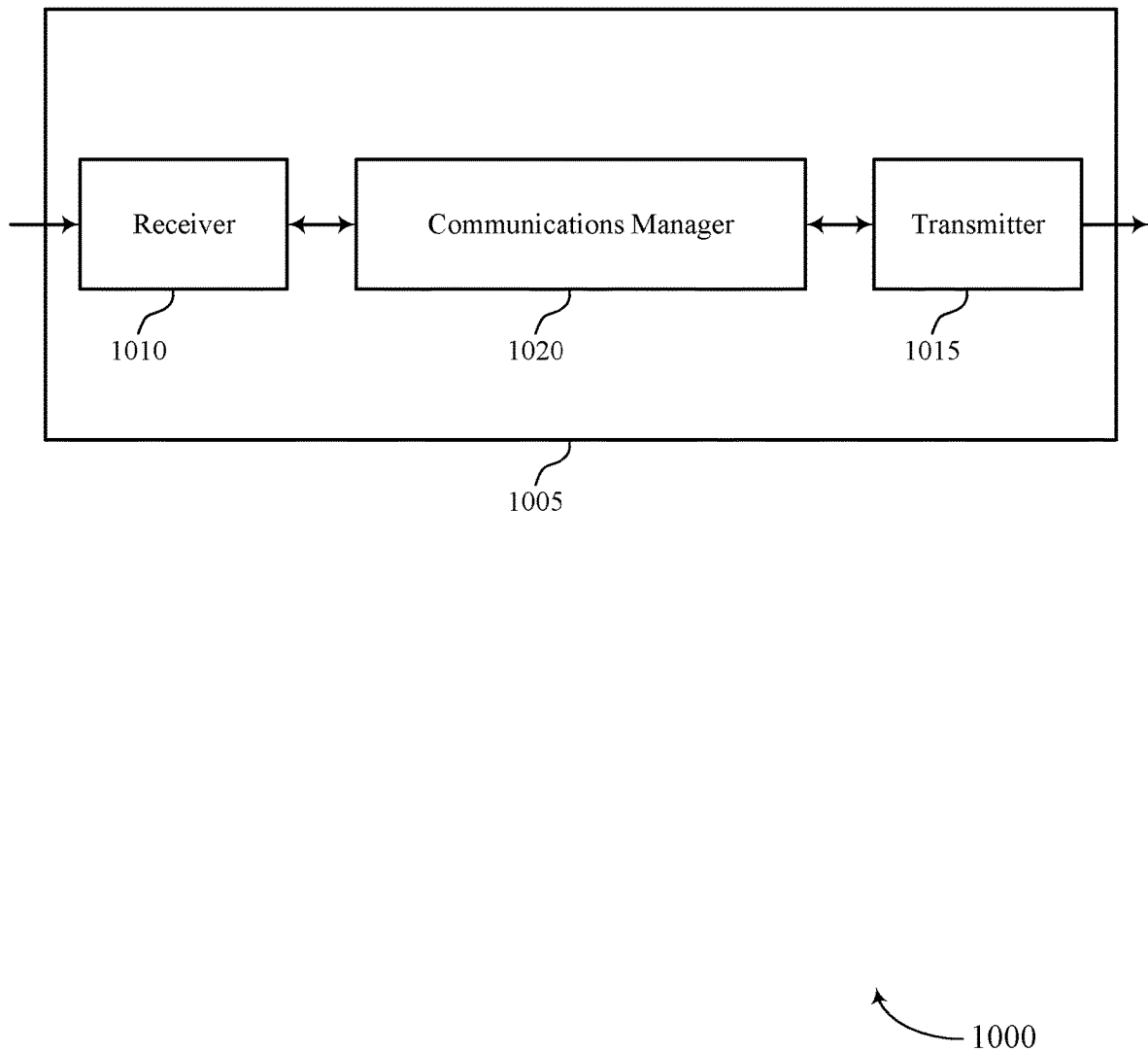
FIGS. 10 and 11 show block diagrams of devices that support techniques for modifying CSI in accordance with aspects of the present disclosure.

FIG. 10 shows a block diagram 1000 of a device 1005 that supports techniques for modifying CSI in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for modifying CSI). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for modifying CSI). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for modifying CSI as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting, to a UE, one or more downlink messages associated with reporting CSI between the base station and the UE. The communications manager 1020 may be configured as or otherwise support a means for receiving, from the UE, a CSI report associated with the one or more downlink messages, where the CSI report includes CSI that is modified based on a quantity of occasions that a scheduled transmission of the CSI report is delayed.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for may support techniques for reduced processing, reduced power consumption, and more efficient utilization of communication resources, for example, by enabling CSI report content modification (e.g., when a CSI report transmission is delayed).

Figure 11:
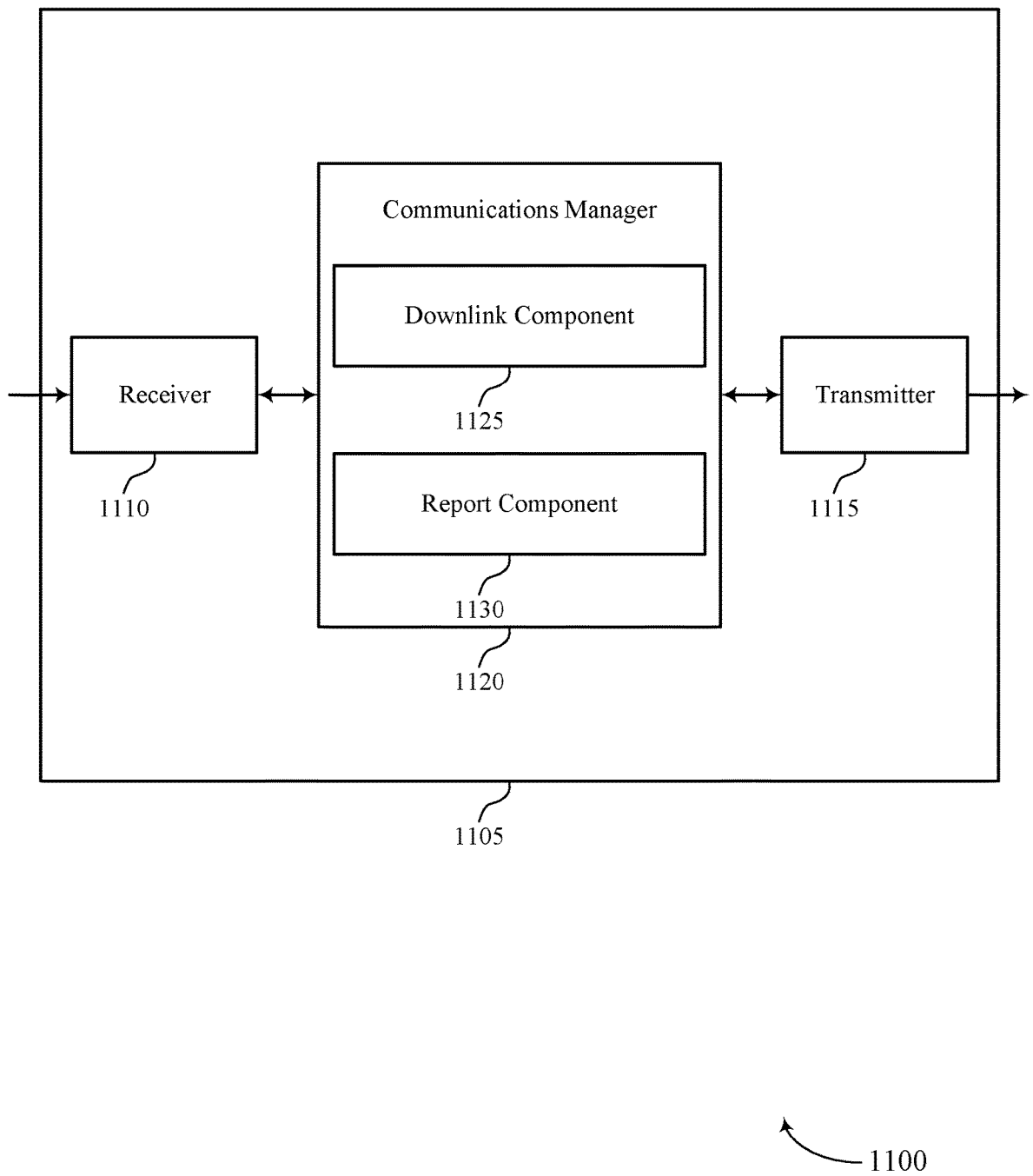

FIG. 11 shows a block diagram 1100 of a device 1105 that supports techniques for modifying CSI in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for modifying CSI). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for modifying CSI). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for modifying CSI as described herein. For example, the communications manager 1120 may include a downlink component 1125 a report component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The downlink component 1125 may be configured as or otherwise support a means for transmitting, to a UE, one or more downlink messages associated with reporting CSI between the base station and the UE. The report component 1130 may be configured as or otherwise support a means for receiving, from the UE, a CSI report associated with the one or more downlink messages, where the CSI report includes CSI that is modified based on a quantity of occasions that a scheduled transmission of the CSI report is delayed.

Figure 12:
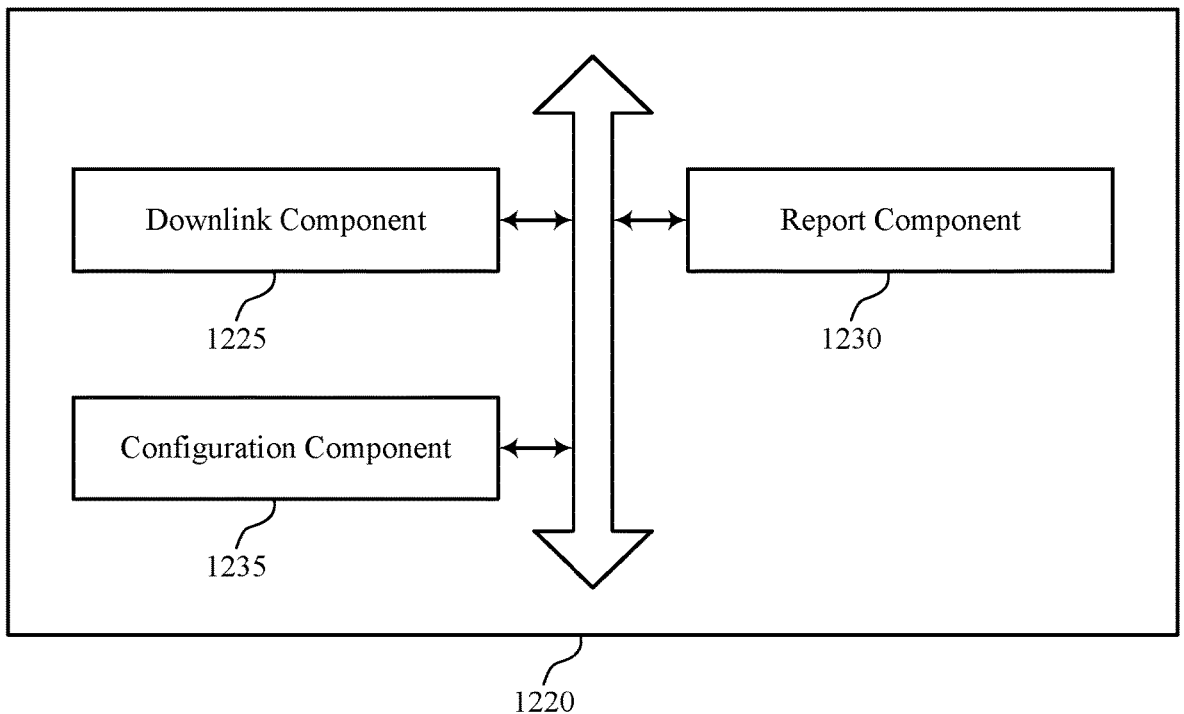
FIG. 12 shows a block diagram of a communications manager that supports techniques for modifying CSI in accordance with aspects of the present disclosure.

FIG. 12 shows a block diagram 1200 of a communications manager 1220 that supports techniques for modifying CSI in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for modifying CSI as described herein. For example, the communications manager 1220 may include a downlink component 1225, a report component 1230, a configuration component 1235, or any combination thereof. Each of these components may communicate, directly or indirectly, with one another (e.g., via one or more buses).

The communications manager 1220 may support wireless communication at a base station in accordance with examples as disclosed herein. The downlink component 1225 may be configured as or otherwise support a means for transmitting, to a UE, one or more downlink messages associated with reporting CSI between the base station and the UE. The report component 1230 may be configured as or otherwise support a means for receiving, from the UE, a CSI report associated with the one or more downlink messages, where the CSI report includes CSI that is modified based on a quantity of occasions that a scheduled transmission of the CSI report is delayed.

In some examples, one or more CSI types are dropped from the CSI report based on the quantity of occasions that the scheduled transmission of the CSI report is delayed.

In some examples, the one or more CSI types include a DMRS RSRP, a wideband PMI, a subband PMI, a wideband CQI, a subband CQI, a rank indicator, or a combination thereof.

In some examples, the report component 1230 may be configured as or otherwise support a means for receiving, from the UE, one or more HARQ feedback reports corresponding to the one or more downlink messages, one or more other downlink messages, or both, where the CSI is modified based on the one or more HARQ feedback reports.

In some examples, the one or more HARQ feedback reports and the CSI report are multiplexed and received in a same uplink resource. In some examples, the CSI is modified such that a payload size of the multiplexed one or more HARQ feedback reports and CSI report satisfies a threshold payload size.

In some examples, the CSI is modified based on a priority associated with the one or more downlink messages, a QoS associated with the one or more downlink messages, or a combination thereof.

In some examples, one or more CSI types are included in the modified CSI based on the priority satisfying a threshold priority, the QOS satisfying a threshold QoS, or a combination thereof.

In some examples, the configuration component 1235 may be configured as or otherwise support a means for transmitting, to the UE, an indication of a sequence of reporting configurations for the CSI report, each reporting configuration indicating a respective set of CSI types to include in the CSI report or drop from the CSI report, where the CSI is modified in accordance with a reporting configuration of the sequence of reporting configurations based on the quantity of occasions that the scheduled transmission of the CSI report is delayed.

In some examples, the configuration component 1235 may be configured as or otherwise support a means for transmitting, to the UE, an indication of a reporting configuration for the CSI report, the reporting configuration including a set of multiple sets of CSI types to include in the CSI report or drop from the CSI report, where the CSI is modified in accordance with a set of CSI types of the plurality based on the quantity of occasions that the scheduled transmission of the CSI report is delayed.

In some examples, the UE and the base station are configured to communicate in accordance with an SPS scheme and a TDD scheme. In some examples, the scheduled transmission of the CSI report is delayed based on a collision between a downlink slot of the TDD scheme and an uplink grant for transmitting the CSI report associated with the SPS scheme.

Figure 13:
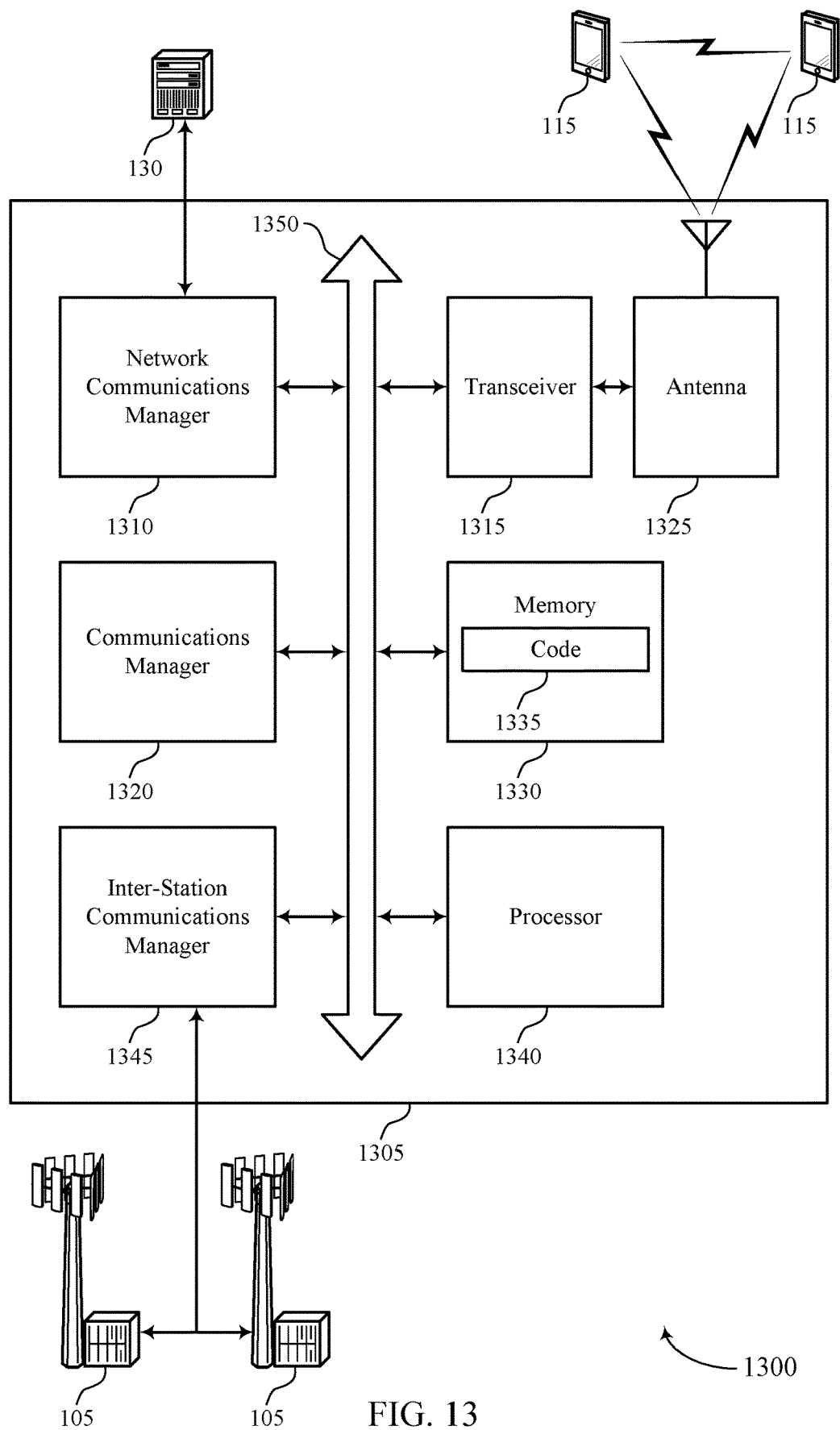
FIG. 13 shows a diagram of a system including a device that supports techniques for modifying CSI in accordance with aspects of the present disclosure.

FIG. 13 shows a diagram of a system 1300 including a device 1305 that supports techniques for modifying CSI in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for modifying CSI). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting, to a UE, one or more downlink messages associated with reporting CSI between the base station and the UE. The communications manager 1320 may be configured as or otherwise support a means for receiving, from the UE, a CSI report associated with the one or more downlink messages, where the CSI report includes CSI that is modified based on a quantity of occasions that a scheduled transmission of the CSI report is delayed.

By including or configuring the communications manager 1320 in accordance with examples as described herein, the device 1305 may support techniques for increased resource utilization efficiency, increased spectral efficiency, increased data rates, increased reliability, reduced latency, reduced power consumption, improved coordination between devices, and improved utilization of processing capability, among other benefits, by supporting the prioritization and modification of CSI report content.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for modifying CSI as described herein, or the processor 1340 and the memory 1330 may be otherwise configured to perform or support such operations.

Figure 14:
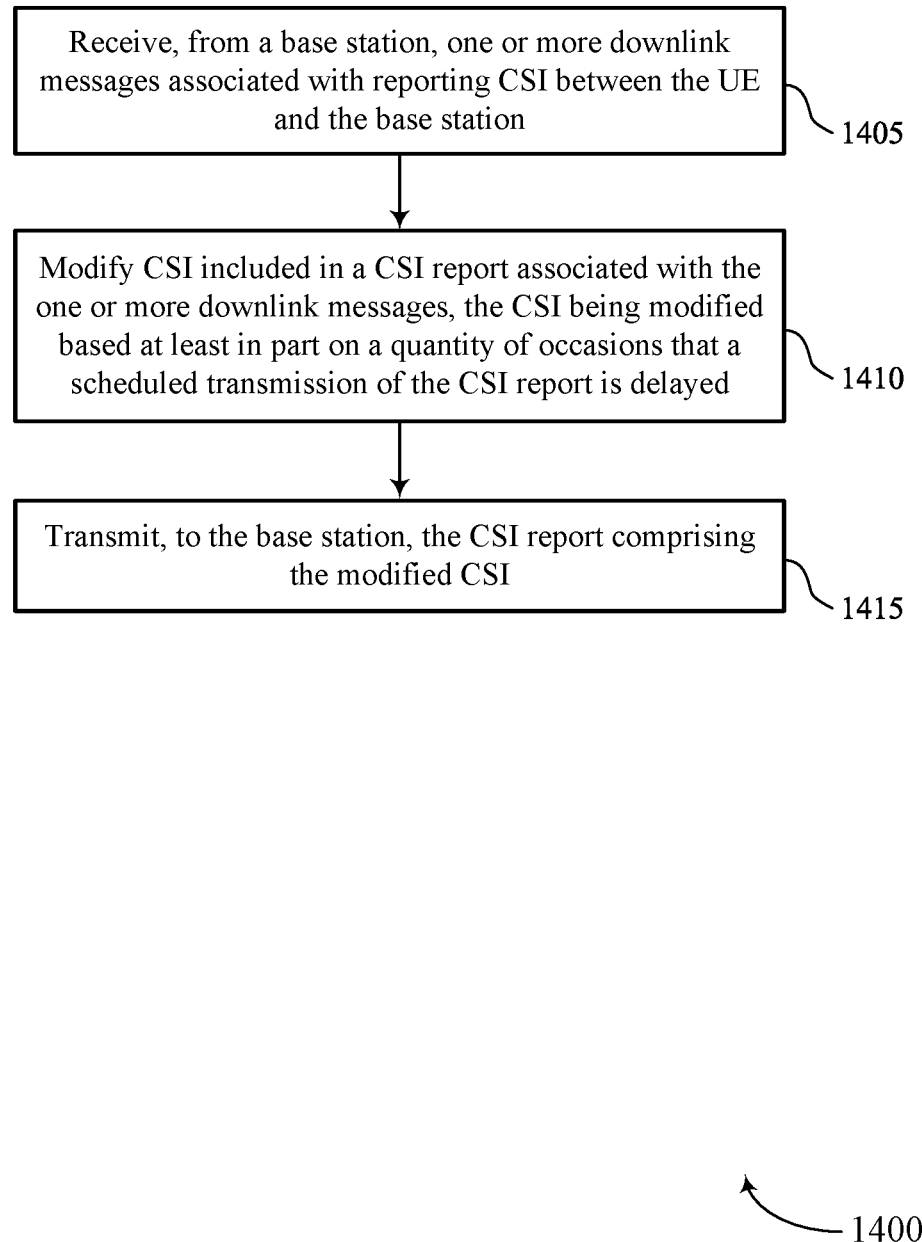
FIGS. 14 through 19 show flowcharts illustrating methods that support techniques for modifying CSI in accordance with aspects of the present disclosure.

FIG. 14 shows a flowchart illustrating a method 1400 that supports techniques for modifying CSI in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, one or more downlink messages associated with reporting CSI between the UE and the base station. The operations of 1405 may be performed in accordance with examples as disclosed herein. In some examples, aspects of the operations of 1405 may be performed by a downlink component 825 as described with reference to FIG. 8.

At 1410, the method may include modifying CSI included in a CSI report associated with the one or more downlink messages, the CSI being modified based on a quantity of occasions that a scheduled transmission of the CSI report is delayed. The operations of 1410 may be performed in accordance with examples as disclosed herein. In some examples, aspects of the operations of 1410 may be performed by a CSI component 830 as described with reference to FIG. 8.

At 1415, the method may include transmitting, to the base station, the CSI report including the modified CSI. The operations of 1415 may be performed in accordance with examples as disclosed herein. In some examples, aspects of the operations of 1415 may be performed by a report component 835 as described with reference to FIG. 8.

Figure 15:
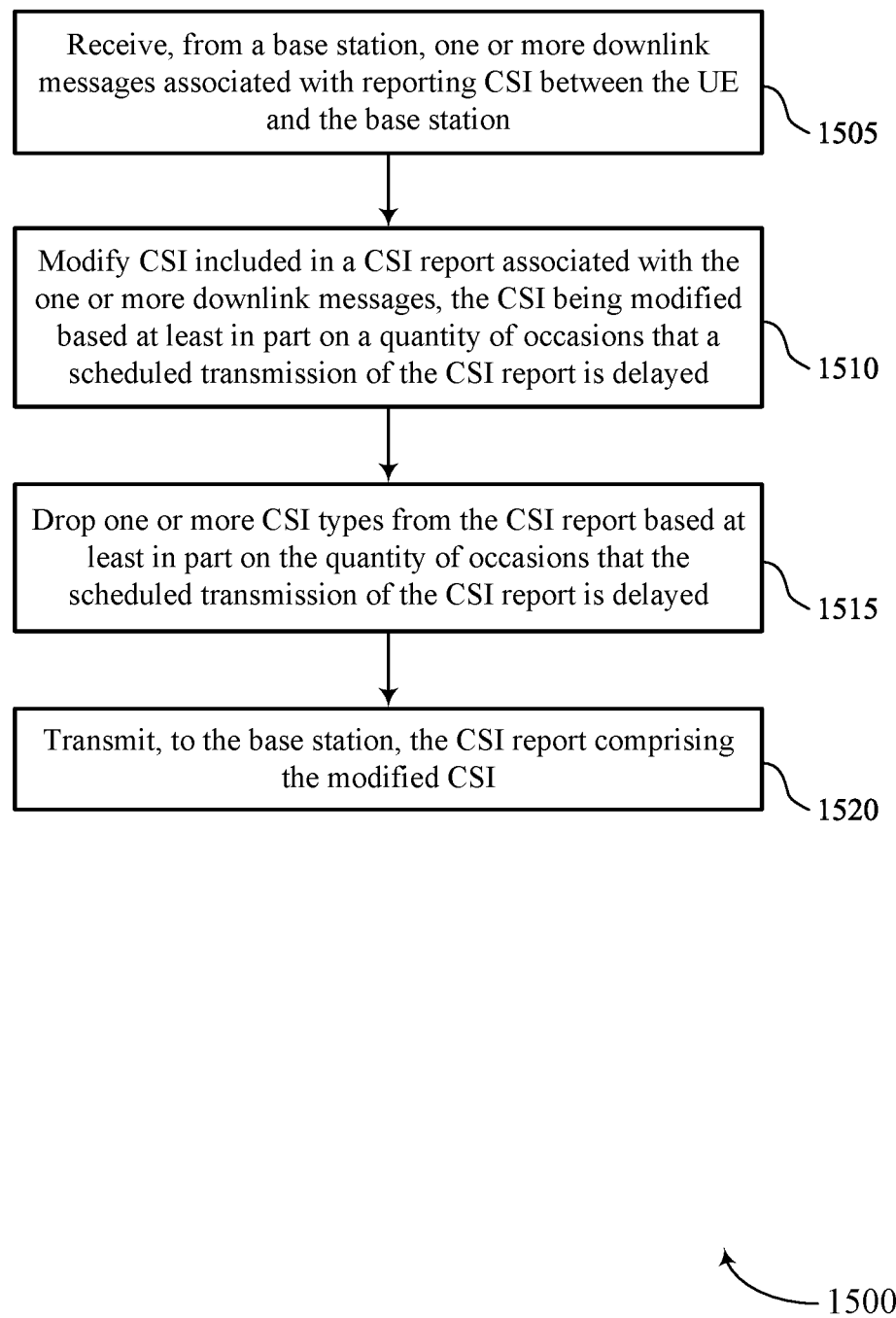

FIG. 15 shows a flowchart illustrating a method 1500 that supports techniques for modifying CSI in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, one or more downlink messages associated with reporting CSI between the UE and the base station. The operations of 1505 may be performed in accordance with examples as disclosed herein. In some examples, aspects of the operations of 1505 may be performed by a downlink component 825 as described with reference to FIG. 8.

At 1510, the method may include modifying CSI included in a CSI report associated with the one or more downlink messages, the CSI being modified based on a quantity of occasions that a scheduled transmission of the CSI report is delayed. The operations of 1510 may be performed in accordance with examples as disclosed herein. In some examples, aspects of the operations of 1510 may be performed by a CSI component 830 as described with reference to FIG. 8.

At 1515, to modify the CSI included in the CSI report, the method may include dropping one or more CSI types from the CSI report based on the quantity of occasions that the scheduled transmission of the CSI report is delayed. The operations of 1515 may be performed in accordance with examples as disclosed herein. In some examples, aspects of the operations of 1515 may be performed by a CSI component 830 as described with reference to FIG. 8.

At 1520, the method may include transmitting, to the base station, the CSI report including the modified CSI. The operations of 1520 may be performed in accordance with examples as disclosed herein. In some examples, aspects of the operations of 1520 may be performed by a report component 835 as described with reference to FIG. 8.

Figure 16:
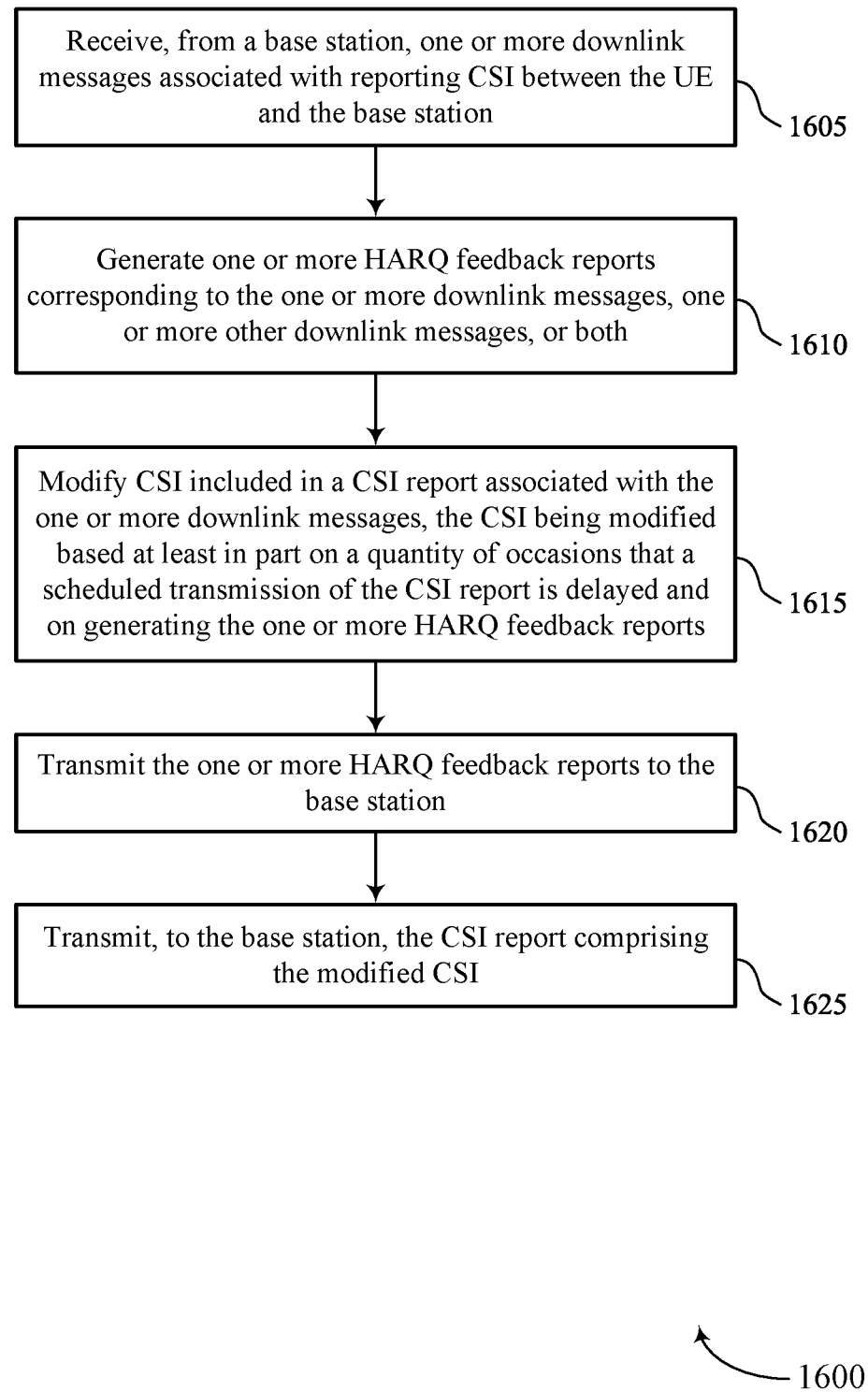

FIG. 16 shows a flowchart illustrating a method 1600 that supports techniques for modifying CSI in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, one or more downlink messages associated with reporting CSI between the UE and the base station. The operations of 1605 may be performed in accordance with examples as disclosed herein. In some examples, aspects of the operations of 1605 may be performed by a downlink component 825 as described with reference to FIG. 8.

At 1610, the method may include generating one or more HARQ feedback reports corresponding to the one or more downlink messages, one or more other downlink messages, or both. The operations of 1610 may be performed in accordance with examples as disclosed herein. In some examples, aspects of the operations of 1610 may be performed by an HARQ component 840 as described with reference to FIG. 8.

At 1615, the method may include modifying CSI included in a CSI report associated with the one or more downlink messages, the CSI being modified based on a quantity of occasions that a scheduled transmission of the CSI report is delayed and on generating the one or more HARQ feedback reports. The operations of 1615 may be performed in accordance with examples as disclosed herein. In some examples, aspects of the operations of 1615 may be performed by a CSI component 830 as described with reference to FIG. 8.

At 1620, the method may include transmitting the one or more HARQ feedback reports to the base station. The operations of 1620 may be performed in accordance with examples as disclosed herein. In some examples, aspects of the operations of 1620 may be performed by a report component 835 as described with reference to FIG. 8.

At 1625, the method may include transmitting, to the base station, the CSI report including the modified CSI. The operations of 1625 may be performed in accordance with examples as disclosed herein. In some examples, aspects of the operations of 1625 may be performed by a report component 835 as described with reference to FIG. 8.

Figure 17:
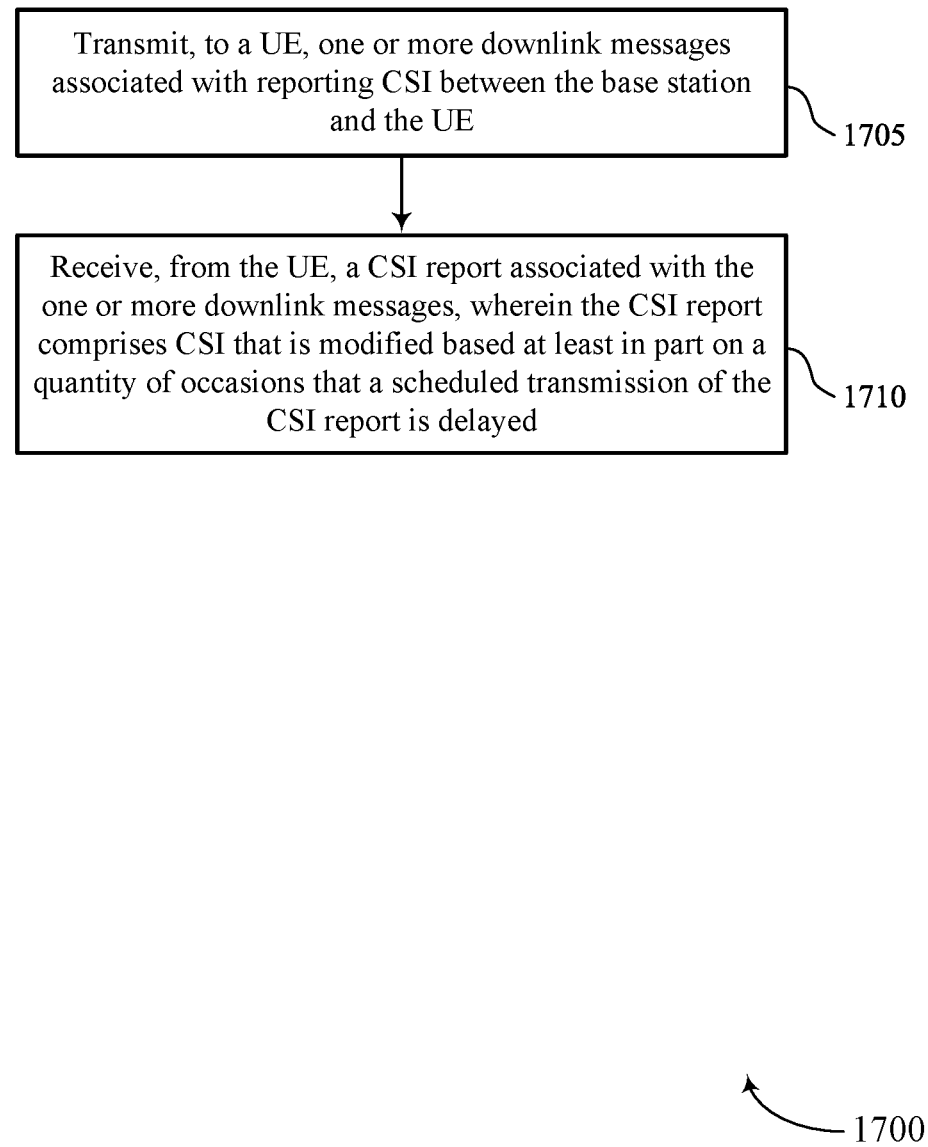

FIG. 17 shows a flowchart illustrating a method 1700 that supports techniques for modifying CSI in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, one or more downlink messages associated with reporting CSI between the base station and the UE. The operations of 1705 may be performed in accordance with examples as disclosed herein. In some examples, aspects of the operations of 1705 may be performed by a downlink component 1225 as described with reference to FIG. 12.

At 1710, the method may include receiving, from the UE, a CSI report associated with the one or more downlink messages, where the CSI report includes CSI that is modified based on a quantity of occasions that a scheduled transmission of the CSI report is delayed. The operations of 1710 may be performed in accordance with examples as disclosed herein. In some examples, aspects of the operations of 1710 may be performed by a report component 1230 as described with reference to FIG. 12.

Figure 18:
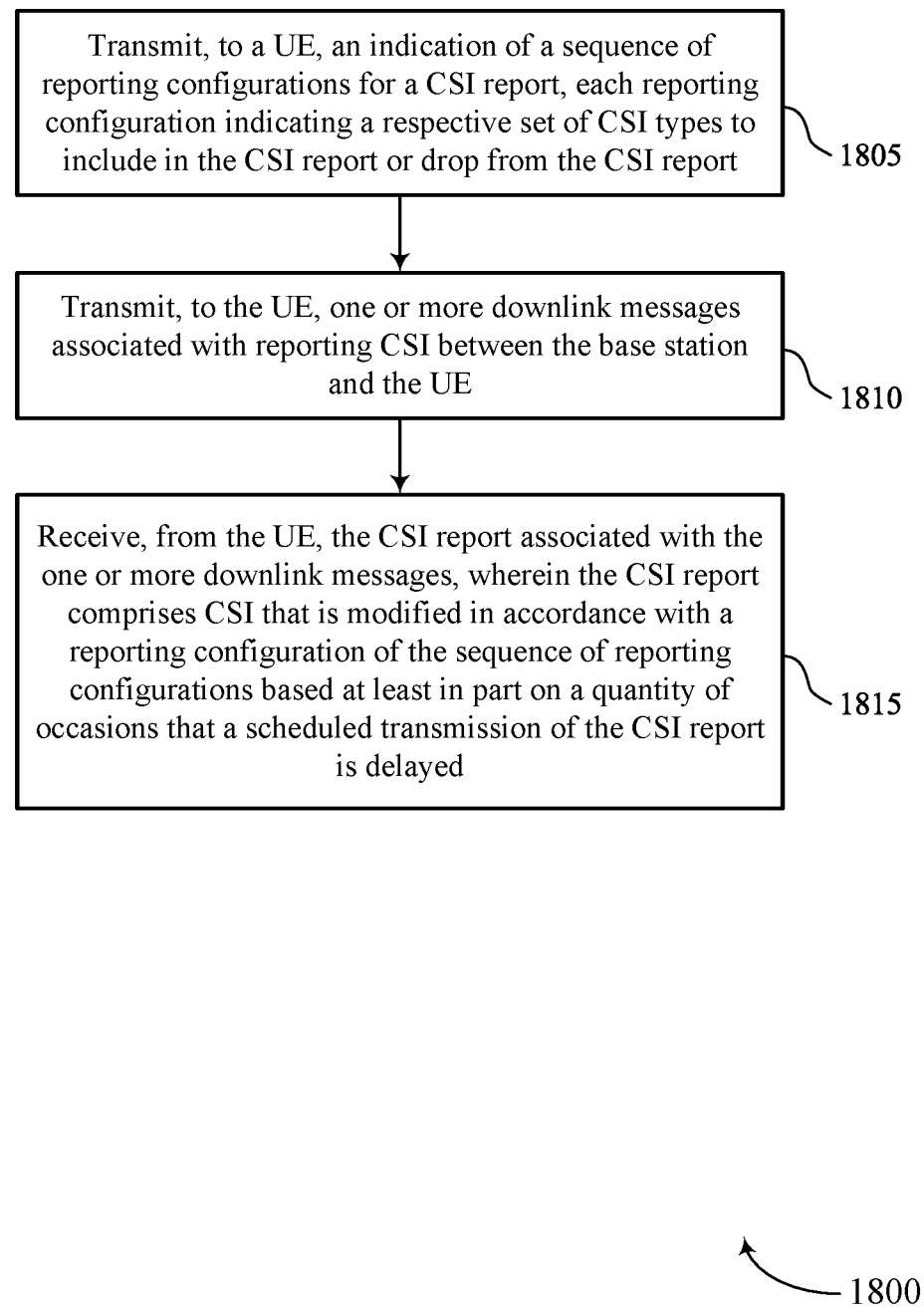

FIG. 18 shows a flowchart illustrating a method 1800 that supports techniques for modifying CSI in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, an indication of a sequence of reporting configurations for a CSI report, each reporting configuration indicating a respective set of CSI types to include in the CSI report or drop from the CSI report. The operations of 1805 may be performed in accordance with examples as disclosed herein. In some examples, aspects of the operations of 1805 may be performed by a configuration component 1235 as described with reference to FIG. 12.

At 1810, the method may include transmitting, to the UE, one or more downlink messages associated with reporting CSI between the base station and the UE. The operations of 1810 may be performed in accordance with examples as disclosed herein. In some examples, aspects of the operations of 1810 may be performed by a downlink component 1225 as described with reference to FIG. 12.

At 1815, the method may include receiving, from the UE, the CSI report associated with the one or more downlink messages, where the CSI report includes CSI that is modified in accordance with a reporting configuration of the sequence of reporting configurations based on a quantity of occasions that a scheduled transmission of the CSI report is delayed. The operations of 1815 may be performed in accordance with examples as disclosed herein. In some examples, aspects of the operations of 1815 may be performed by a report component 1230 as described with reference to FIG. 12.

Figure 19:
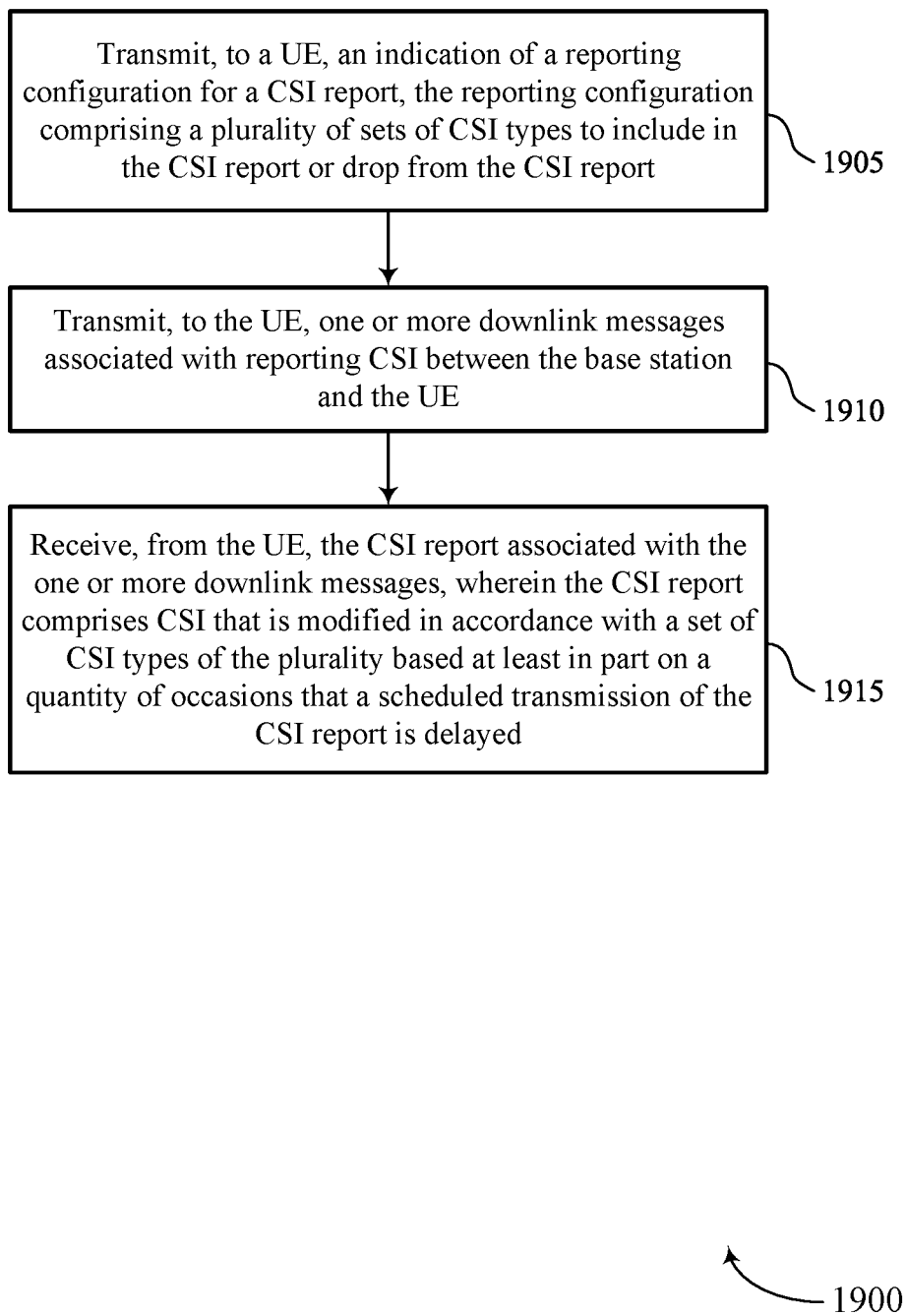

FIG. 19 shows a flowchart illustrating a method 1900 that supports techniques for modifying CSI in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, an indication of a reporting configuration for a CSI report, the reporting configuration including multiple sets of CSI types to include in the CSI report or drop from the CSI report. The operations of 1905 may be performed in accordance with examples as disclosed herein. In some examples, aspects of the operations of 1905 may be performed by a configuration component 1235 as described with reference to FIG. 12.

At 1910, the method may include transmitting, to the UE, one or more downlink messages associated with reporting CSI between the base station and the UE. The operations of 1910 may be performed in accordance with examples as disclosed herein. In some examples, aspects of the operations of 1910 may be performed by a downlink component 1225 as described with reference to FIG. 12.

At 1915, the method may include receiving, from the UE, the CSI report associated with the one or more downlink messages, where the CSI report includes CSI that is modified in accordance with a set of CSI types of the multiple sets based on a quantity of occasions that a scheduled transmission of the CSI report is delayed. The operations of 1915 may be performed in accordance with examples as disclosed herein. In some examples, aspects of the operations of 1915 may be performed by a report component 1230 as described with reference to FIG. 12.

The following provides an overview of aspects of the present disclosure:

Aspect 1: A method for wireless communication at a UE, comprising: receiving, from a base station, one or more downlink messages associated with reporting CSI between the UE and the base station; modifying CSI included in a CSI report associated with the one or more downlink messages, the CSI being modified based at least in part on a quantity of occasions that a scheduled transmission of the CSI report is delayed; and transmitting, to the base station, the CSI report comprising the modified CSI.

Aspect 2: The method of aspect 1, wherein modifying the CSI included for the CSI report comprises: dropping one or more CSI types from the CSI report based at least in part on the quantity of occasions that the scheduled transmission of the CSI report is delayed.

Aspect 3: The method of aspect 2, wherein the one or more CSI types comprise a DMRS RSRP, a wideband PMI, a subband PMI, a wideband CQI, a subband CQI, a rank indicator, or a combination thereof.

Aspect 4: The method of any of aspects 1 through 3, further comprising: receiving, from the base station, one or more additional downlink messages associated with reporting second CSI between the UE and the base station; and dropping a transmission of a second CSI report associated with the one or more additional downlink messages based at least in part on a second quantity of occasions that a scheduled transmission of the second CSI report is delayed satisfying a threshold.

Aspect 5: The method of any of aspects 1 through 4, further comprising: generating one or more HARQ feedback reports corresponding to the one or more downlink messages, one or more other downlink messages, or both, wherein the CSI is modified based at least in part on generating the one or more HARQ feedback reports; and transmitting the one or more HARQ feedback reports to the base station.

Aspect 6: The method of aspect 5, further comprising: multiplexing the one or more HARQ feedback reports and the CSI report comprising the modified CSI, wherein the one or more HARQ feedback reports and the CSI report are transmitted using a same uplink resource, and wherein the CSI is modified such that a payload size of the multiplexed one or more HARQ feedback reports and CSI report satisfies a threshold payload size.

Aspect 7: The method of any of aspects 1 through 6, wherein the CSI is modified based at least in part on a priority associated with the one or more downlink messages, a QoS associated with the one or more downlink messages, or a combination thereof.

Aspect 8: The method of aspect 7, wherein modifying the CSI included for the CSI report comprises: refraining from dropping one or more CSI types from the CSI report based at least in part on the priority satisfying a threshold priority, the QoS satisfying a threshold QoS, or a combination thereof.

Aspect 9: The method of any of aspects 1 through 8, further comprising: receiving, from the base station, an indication of a sequence of reporting configurations for the CSI report, wherein each reporting configuration indicates a respective set of CSI types to include in the CSI report or drop from the CSI report; and selecting a reporting configuration from the sequence of reporting configurations based at least in part on the quantity of occasions that the scheduled transmission of the CSI report is delayed, wherein the CSI is modified in accordance with the selected reporting configuration.

Aspect 10: The method of any of aspects 1 through 8, further comprising: receiving, from the base station, an indication of a reporting configuration for the CSI report, wherein the reporting configuration comprises a plurality of sets of CSI types to include in the CSI report or drop from the CSI report; and selecting a set of CSI types from the plurality based at least in part on the quantity of occasions that the scheduled transmission of the CSI report is delayed, wherein the CSI is modified in accordance with the selected set of CSI types.

Aspect 11: The method of any of aspects 1 through 10, wherein the UE and the base station are configured to communicate in accordance with an SPS scheme and a TDD scheme, and the scheduled transmission of the CSI report is delayed based at least in part on a collision between a downlink slot of the TDD scheme and an uplink grant for transmitting the CSI report associated with the SPS scheme.

Aspect 12: The method of any of aspects 1 through 11, further comprising: receiving, from a second UE, one or more sidelink messages associated with reporting CSI between the UE and the second UE; modifying second CSI included in a second CSI report associated with the one or more sidelink messages, the CSI being modified based at least in part on a quantity of occasions that a scheduled transmission of the second CSI report is delayed; and transmitting, to the second UE, the second CSI report comprising the modified second CSI.

Aspect 13: A method for wireless communication at a base station, comprising: transmitting, to a UE, one or more downlink messages associated with reporting CSI between the base station and the UE; and receiving, from the UE, a CSI report associated with the one or more downlink messages, wherein the CSI report comprises CSI that is modified based at least in part on a quantity of occasions that a scheduled transmission of the CSI report is delayed.

Aspect 14: The method of aspect 13, wherein one or more CSI types are dropped from the CSI report based at least in part on the quantity of occasions that the scheduled transmission of the CSI report is delayed.

Aspect 15: The method of aspect 14, wherein the one or more CSI types comprise a DMRS RSRP, a wideband PMI, a subband PMI, a wideband CQI, a subband CQI, a rank indicator, or a combination thereof.

Aspect 16: The method of any of aspects 13 through 15, further comprising: receiving, from the UE, one or more HARQ feedback reports corresponding to the one or more downlink messages, one or more other downlink messages, or both, wherein the CSI is modified based at least in part on the one or more HARQ feedback reports.

Aspect 17: The method of aspect 16, wherein the one or more HARQ feedback reports and the CSI report are multiplexed and received in a same uplink resource, and the CSI is modified such that a payload size of the multiplexed one or more HARQ feedback reports and CSI report satisfies a threshold payload size.

Aspect 18: The method of any of aspects 13 through 17, wherein the CSI is modified based at least in part on a priority associated with the one or more downlink messages, a QoS associated with the one or more downlink messages, or a combination thereof.

Aspect 19: The method of aspect 18, wherein one or more CSI types are included in the modified CSI based at least in part on the priority satisfying a threshold priority, the QoS satisfying a threshold QoS, or a combination thereof.

Aspect 20: The method of any of aspects 13 through 19, further comprising: transmitting, to the UE, an indication of a sequence of reporting configurations for the CSI report, each reporting configuration indicating a respective set of CSI types to include in the CSI report or drop from the CSI report, wherein the CSI is modified in accordance with a reporting configuration of the sequence of reporting configurations based at least in part on the quantity of occasions that the scheduled transmission of the CSI report is delayed.

Aspect 21: The method of any of aspects 13 through 19, further comprising: transmitting, to the UE, an indication of a reporting configuration for the CSI report, the reporting configuration comprising a plurality of sets of CSI types to include in the CSI report or drop from the CSI report, wherein the CSI is modified in accordance with a set of CSI types of the plurality based at least in part on the quantity of occasions that the scheduled transmission of the CSI report is delayed.

Aspect 22: The method of any of aspects 13 through 21, wherein the UE and the base station are configured to communicate in accordance with an SPS scheme and a TDD scheme, and the scheduled transmission of the CSI report is delayed based at least in part on a collision between a downlink slot of the TDD scheme and an uplink grant for transmitting the CSI report associated with the SPS scheme.

Aspect 23: An apparatus for wireless communication at a UE, comprising a processor; memory coupled with the processor; and instructions stored in the memory and executable by the processor to cause the apparatus to perform a method of any of aspects 1 through 12.

Aspect 24: An apparatus for wireless communication at a UE, comprising at least one means for performing a method of any of aspects 1 through 12.

Aspect 25: A non-transitory computer-readable medium storing code for wireless communication at a UE, the code comprising instructions executable by a processor to perform a method of any of aspects 1 through 12.

Aspect 26: An apparatus for wireless communication at a base station, comprising a processor; memory coupled with the processor; and instructions stored in the memory and executable by the processor to cause the apparatus to perform a method of any of aspects 13 through 22.

Aspect 27: An apparatus for wireless communication at a base station, comprising at least one means for performing a method of any of aspects 13 through 22.

Aspect 28: A non-transitory computer-readable medium storing code for wireless communication at a base station, the code comprising instructions executable by a processor to perform a method of any of aspects 13 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more memories; and
   one or more processors coupled to the one or more memories and configured to:
      receive, from a base station, one or more downlink messages associated with reporting channel state information between the UE and the base station;
      modify channel state information included in a channel state information report associated with the one or more downlink messages, the channel state information being modified differently based at least in part on different quantities of occasions that a scheduled transmission of the channel state information report is delayed; and
      transmit, to the base station, the channel state information report comprising the modified channel state information.

2. The apparatus of claim 1, wherein, to modify the channel state information included in the channel state information report, the one or more processors are configured to:
   drop one or more channel state information types from the channel state information report based at least in part on a quantity of occasions that the scheduled transmission of the channel state information report is delayed.

3. The apparatus of claim 2, wherein the one or more channel state information types comprise a demodulation reference signal reference signal received power, a wideband precoding matrix indicator, a subband precoding matrix indicator, a wideband channel quality indicator, a subband channel quality indicator, a rank indicator, or a combination thereof.

4. The apparatus of claim 1, wherein the one or more processors are further configured to:
   receive, from the base station, one or more additional downlink messages associated with reporting second channel state information between the UE and the base station; and
   drop a transmission of a second channel state information report associated with the one or more additional downlink messages based at least in part on a second quantity of occasions that a scheduled transmission of the second channel state information report is delayed satisfying a threshold.

5. The apparatus of claim 1, wherein the one or more processors are further configured to:
   generate one or more hybrid automatic repeat request feedback reports corresponding to the one or more downlink messages, one or more other downlink messages, or both, wherein the channel state information is modified based at least in part on generating the one or more hybrid automatic repeat request feedback reports; and
   transmit the one or more hybrid automatic repeat request feedback reports to the base station.

6. The apparatus of claim 5, wherein the one or more processors are further configured to:
   multiplex the one or more hybrid automatic repeat request feedback reports and the channel state information report comprising the modified channel state information, wherein the one or more hybrid automatic repeat request feedback reports and the channel state information report are transmitted using a same uplink resource, and wherein the channel state information is modified such that a payload size of the multiplexed one or more hybrid automatic repeat request feedback reports and channel state information report satisfies a threshold payload size.

7. The apparatus of claim 1, wherein the channel state information is modified based at least in part on a priority associated with the one or more downlink messages, a quality of service associated with the one or more downlink messages, or a combination thereof.

8. The apparatus of claim 7, wherein, to modify the channel state information included in the channel state information report, the one or more processors are configured to:

refrain from dropping one or more channel state information types from the channel state information report based at least in part on the priority satisfying a threshold priority, the quality of service satisfying a threshold quality of service, or a combination thereof.

9. The apparatus of claim 1, wherein the one or more processors are further configured to:
receive, from the base station, an indication of a sequence of reporting configurations for the channel state information report, wherein each reporting configuration indicates a respective set of channel state information types to include in the channel state information report or drop from the channel state information report; and
select a reporting configuration from the sequence of reporting configurations based at least in part on a quantity of occasions that the scheduled transmission of the channel state information report is delayed, wherein the channel state information is modified in accordance with the selected reporting configuration.

10. The apparatus of claim 1, wherein the one or more processors are further configured to:
receive, from the base station, an indication of a reporting configuration for the channel state information report, wherein the reporting configuration comprises a plurality of sets of channel state information types to include in the channel state information report or drop from the channel state information report; and
select a set of channel state information types from the plurality based at least in part on a quantity of occasions that the scheduled transmission of the channel state information report is delayed, wherein the channel state information is modified in accordance with the selected set of channel state information types.

11. The apparatus of claim 1, wherein:
the UE and the base station are configured to communicate in accordance with a semi-persistent scheduling scheme and a time division duplexing scheme, and the scheduled transmission of the channel state information report is delayed based at least in part on a collision between a downlink slot of the time division duplexing scheme and an uplink grant for transmitting the channel state information report associated with the semi-persistent scheduling scheme.

12. The apparatus of claim 1, wherein the one or more processors are further configured to:
receive, from a second UE, one or more sidelink messages associated with reporting channel state information between the UE and the second UE;
modify second channel state information included in a second channel state information report associated with the one or more sidelink messages, the channel state information being modified based at least in part on a quantity of occasions that a scheduled transmission of the second channel state information report is delayed; and
transmit, to the second UE, the second channel state information report comprising the modified second channel state information.

13. An apparatus for wireless communication at a base station, comprising:
one or more memories; and
one or more processors coupled to the one or more memories and configured to:
transmit, to a user equipment (UE), one or more downlink messages associated with reporting channel state information between the base station and the UE; and
receive, from the UE, a channel state information report associated with the one or more downlink messages, wherein the channel state information report comprises channel state information that is modified differently based at least in part on different quantities of occasions that a scheduled transmission of the channel state information report is delayed.

14. The apparatus of claim 13, wherein one or more channel state information types are dropped from the channel state information report based at least in part on a quantity of occasions that the scheduled transmission of the channel state information report is delayed.

15. The apparatus of claim 14, wherein the one or more channel state information types comprise a demodulation reference signal reference signal received power, a wideband precoding matrix indicator, a subband precoding matrix indicator, a wideband channel quality indicator, a subband channel quality indicator, a rank indicator, or a combination thereof.

16. The apparatus of claim 13, wherein the one or more processors are further configured to:
receive, from the UE, one or more hybrid automatic repeat request feedback reports corresponding to the one or more downlink messages, one or more other downlink messages, or both, wherein the channel state information is modified based at least in part on the one or more hybrid automatic repeat request feedback reports.

17. The apparatus of claim 16, wherein:
the one or more hybrid automatic repeat request feedback reports and the channel state information report are multiplexed and received in a same uplink resource, and the channel state information is modified such that a payload size of the multiplexed one or more hybrid automatic repeat request feedback reports and channel state information report satisfies a threshold payload size.

18. The apparatus of claim 13, wherein the channel state information is modified based at least in part on a priority associated with the one or more downlink messages, a quality of service associated with the one or more downlink messages, or a combination thereof.

19. The apparatus of claim 18, wherein one or more channel state information types are included in the modified channel state information based at least in part on the priority satisfying a threshold priority, the quality of service satisfying a threshold quality of service, or a combination thereof.

20. The apparatus of claim 13, wherein the one or more processors are further configured to:
transmit, to the UE, an indication of a sequence of reporting configurations for the channel state information report, each reporting configuration indicating a respective set of channel state information types to include in the channel state information report or drop from the channel state information report, wherein the channel state information is modified in accordance with a reporting configuration of the sequence of reporting configurations based at least in part on a quantity of occasions that the scheduled transmission of the channel state information report is delayed.

21. The apparatus of claim 13, wherein the one or more processors are further configured to:
transmit, to the UE, an indication of a reporting configuration for the channel state information report, the reporting configuration comprising a plurality of sets of channel state information types to include in the channel state information report or drop from the channel state information report, wherein the channel state information is modified in accordance with a set of channel state information types of the plurality based at least in part on a quantity of occasions that the scheduled transmission of the channel state information report is delayed.

22. The apparatus of claim 13, wherein:
the UE and the base station are configured to communicate in accordance with a semi-persistent scheduling scheme and a time division duplexing scheme, and
the scheduled transmission of the channel state information report is delayed based at least in part on a collision between a downlink slot of the time division duplexing scheme and an uplink grant for transmitting the channel state information report associated with the semi-persistent scheduling scheme.

23. A method for wireless communication at a user equipment (UE), comprising:
receiving, from a base station, one or more downlink messages associated with reporting channel state information between the UE and the base station;
modifying channel state information included in a channel state information report associated with the one or more downlink messages, the channel state information being modified differently based at least in part on different quantities of occasions that a scheduled transmission of the channel state information report is delayed; and
transmitting, to the base station, the channel state information report comprising the modified channel state information.

24. The method of claim 23, wherein modifying the channel state information included in the channel state information report comprises:
dropping one or more channel state information types from the channel state information report based at least in part on a quantity of occasions that the scheduled transmission of the channel state information report is delayed.

25. The method of claim 24, wherein the one or more channel state information types comprise a demodulation reference signal reference signal received power, a wideband precoding matrix indicator, a subband precoding matrix indicator, a wideband channel quality indicator, a subband channel quality indicator, a rank indicator, or a combination thereof.

26. The method of claim 23, wherein the channel state information is modified based at least in part on a priority associated with the one or more downlink messages, a quality of service associated with the one or more downlink messages, or a combination thereof.

27. A method for wireless communication at a base station, comprising:
transmitting, to a user equipment (UE), one or more downlink messages associated with reporting channel state information between the base station and the UE; and
receiving, from the UE, a channel state information report associated with the one or more downlink messages, wherein the channel state information report comprises channel state information that is modified differently based at least in part on different quantities of occasions that a scheduled transmission of the channel state information report is delayed.

28. The method of claim 27, wherein one or more channel state information types are dropped from the channel state information report based at least in part on a quantity of occasions that the scheduled transmission of the channel state information report is delayed.

29. The method of claim 28, wherein the one or more channel state information types comprise a demodulation reference signal reference signal received power, a wideband precoding matrix indicator, a subband precoding matrix indicator, a wideband channel quality indicator, a subband channel quality indicator, a rank indicator, or a combination thereof.

30. The method of claim 27, wherein the channel state information is modified based at least in part on a priority associated with the one or more downlink messages, a quality of service associated with the one or more downlink messages, or a combination thereof.

* * * * *